US011028777B2

(12) United States Patent
Aucamp

(10) Patent No.: US 11,028,777 B2
(45) Date of Patent: Jun. 8, 2021

(54) COOLING SYSTEM FOR EMISSION GASES OF AN ELECTRONICALLY CONTROLLED ENGINE

(71) Applicant: AIM IP (PTY) LIMITED, Delmas (ZA)

(72) Inventor: Paulus Johannes Aucamp, Middelburg (ZA)

(73) Assignee: AIM IP (PTY) LIMITED, Mpumalanga (ZA)

( * ) Notice: Subject to any disclaimer, the term of this patent is extended or adjusted under 35 U.S.C. 154(b) by 85 days.

(21) Appl. No.: 16/060,611

(22) PCT Filed: Dec. 9, 2016

(86) PCT No.: PCT/IB2016/057469
§ 371 (c)(1),
(2) Date: Jun. 8, 2018

(87) PCT Pub. No.: WO2017/098452
PCT Pub. Date: Jun. 15, 2017

(65) Prior Publication Data
US 2018/0372002 A1    Dec. 27, 2018

(30) Foreign Application Priority Data

Dec. 11, 2015   (ZA) .................................. 2015/09043

(51) Int. Cl.
*F02C 7/24*       (2006.01)
*F01N 3/04*       (2006.01)
(Continued)

(52) U.S. Cl.
CPC .................. *F02C 7/24* (2013.01); *F01N 3/04* (2013.01); *F01N 13/102* (2013.01); *F02C 6/12* (2013.01);
(Continued)

(58) Field of Classification Search
CPC .. F01N 13/102; F01N 3/04; F02C 6/12; F02C 7/24; F28D 1/05316; F28F 1/022; F28F 1/14; F28F 1/40; F05D 2220/40
See application file for complete search history.

(56) References Cited

U.S. PATENT DOCUMENTS 5,020,319 A    6/1991  Matsuura et al.
9,644,514 B1 * 5/2017  Langenfeld ............... F01N 3/10
(Continued)

FOREIGN PATENT DOCUMENTS

CN    104005815    8/2014
DE    23 45 383    3/1975
(Continued)

OTHER PUBLICATIONS

International Search Report for PCT/IB2016/057469, dated Mar. 6, 2017, 6 pages.
(Continued)

*Primary Examiner* — Brandon D Lee
(74) *Attorney, Agent, or Firm* — Nixon & Vanderhye P.C.

(57) ABSTRACT

This invention relates to a cooling system for an internal combustion engine, and is particularly suitable for cooling emission gases from electronically controlled, Tier 3 fuel injection engines [12] used in trackless mining machinery, wherein the fuel injection engine [12] includes an exhaust manifold [14], a turbocharger [16], and a catalytic converter [18] through which the emission gasses sequentially pass before they are released to atmosphere. The cooling system [10] comprises an exhaust manifold housing [20] for at least partially encasing the exhaust manifold [14], a turbocharger housing [34] for at least partially encasing the turbocharger [16], and a catalytic converter housing [92] for at least partially encasing the catalytic converter [18]. The cooling system [10] also comprises an exhaust cooler [118] adapted for rapidly cooling emission gasses exiting the catalytic (Continued)

converter [18] before they are released to atmosphere. The cooling system [10] is characterised therein that engine emission gasses are maintained at relatively high temperatures until after they pass through the catalytic converter [18], and thereafter undergoes rapid cooling as they pass through the exhaust cooler [118].

39 Claims, 19 Drawing Sheets

(51) Int. Cl.
    *F28F 1/40*     (2006.01)
    *F28D 1/053*     (2006.01)
    *F28F 1/14*     (2006.01)
    *F01N 13/10*     (2010.01)
    *F02C 6/12*     (2006.01)
    *F28F 1/02*     (2006.01)

(52) U.S. Cl.
    CPC .......... *F28D 1/05316* (2013.01); *F28F 1/022* (2013.01); *F28F 1/14* (2013.01); *F28F 1/40* (2013.01); *F05D 2220/40* (2013.01)

(56) References Cited

U.S. PATENT DOCUMENTS

| | | | | |
|---|---|---|---|---|
| 2003/0140909 | A1* | 7/2003 | Criddle | F02B 37/18 123/572 |
| 2008/0256938 | A1* | 10/2008 | Miretti | F01N 3/06 60/311 |
| 2011/0252775 | A1* | 10/2011 | Joergl | F02C 6/12 60/321 |
| 2013/0042841 | A1* | 2/2013 | Vassallo | F02M 26/28 123/568.12 |
| 2015/0292820 | A1* | 10/2015 | Katoh | F28D 1/0426 165/140 |
| 2017/0101917 | A1* | 4/2017 | Miretti | F01N 3/046 |
| 2018/0328254 | A1* | 11/2018 | Lehtonen | F01N 13/004 |

FOREIGN PATENT DOCUMENTS

| | | |
|---|---|---|
| DE | 10 2011 121328 | 6/2012 |
| WO | 2008/084400 | 7/2008 |

OTHER PUBLICATIONS

Written Opinion of the ISA for PCT/IB2016/057469, dated Mar. 6, 2017, 8 pages.

* cited by examiner

COOLING SYSTEM FOR EMISSION GASES OF AN ELECTRONICALLY CONTROLLED ENGINE

This application is the U.S. national phase of International Application No. PCT/IB2016/057469 filed Dec. 9, 2016, which designated the U.S. and claims priority to ZA Patent Application No. 2015/09043 filed Dec. 11, 2015, the entire contents of each of which are hereby incorporated by reference.

INTRODUCTION

This invention relates to a cooling system for an internal combustion engine. Particularly, although not exclusively, the cooling system is used to cool emission gases from electronically controlled internal combustion diesel engines used in trackless mining machinery.

BACKGROUND TO THE INVENTION

Those who are engaged in the mining industry will appreciate that equipment used in mining operations must comply with legislatively controlled standards and requirements. This is particularly so in underground mining operations, such as platinum, gold, diamond and coal mines, where explosive and/or otherwise flammable gasses and/or mining surfaces are frequently encountered.

A diesel engine (also known as a compression-ignition engine) is an internal combustion engine in which ignition of fuel is initiated by the high temperature which a gas achieves when greatly compressed (adiabatic compression). Diesel exhaust is the gaseous exhaust produced by a diesel type of internal combustion engine. The physical and chemical conditions that exist inside any diesel engine under any conditions differ considerably from spark-ignition engines, because, by design, diesel engine power is not controlled by an air/fuel mixture (as in most gasoline engines), but rather it is directly controlled by the fuel supply. However, the lean-burning nature of diesel engines and the high temperatures and pressures of the combustion process result in significant production of gaseous nitrogen oxides ($NO_x$), an air pollutant, which constitutes a unique challenge with regard to its reduction.

Moreover, fine particulate matter in diesel exhaust (sometimes visible as opaque dark-coloured smoke) has traditionally been of greater concern, as it presents different health concerns. Diesel particulate matter ("DPM"), sometimes also called diesel exhaust particles ("DEP"), is the particulate component of diesel exhaust, which includes diesel soot and aerosols, such as ash particulates, metallic abrasion particles, sulphates and silicates. When released into the atmosphere, DPM can take the form of individual particles or chain aggregates, with most in the invisible sub-micrometre range of 100 nanometre. Diesel exhaust contaminants also include substances listed as human carcinogens by the World Health Organisation. Because of their small size, inhaled particles may easily penetrate deep into the lungs. The rough surfaces of these particles make it easy for them to bind with other toxins in the environment, thus increasing the hazards of particle inhalation.

Diesel engines are categorised according to a global European Emission Standard ("EMS"), which define the acceptable limits for exhaust emissions and which measures, inter alia, DPM emissions from engines. European standards for non-road diesel engines harmonize with the US EPA standards and comprise gradually stringent tiers known as Tier 1-4 standards. So, for example, Tier 0-Tier 2 engines are fuel-injection engines wherein the air/fuel mixture, ignition timing and idle speed are mechanically set and dynamically controlled by mechanical and pneumatic means. Tier 0 and 1 engines are naturally aspirated (under atmospheric pressure), while Tier 2 engines are turbo charged. In all of Tier 0-Tier 2 engines the fuel injectors are individually supplied with diesel fuel by an injector pump which is arranged in flow communication with a fuel tank. Until recently, diesel engines in underground mining operations were required to meet Tier 2 standards of emission. However, because of the levels of DPM still emitted by Tier 2 engines and the resultant conflict with increasingly stringent legislative health and safety regulations, emission requirements are heading towards a Tier 3 standard of emission, also in respect of diesel engines used in mining applications.

The only way to achieve Tier 3 standards of emission in diesel engines is to move away from conventional mechanically controlled engines to electronically controlled engines. Electronically controlled engines comprise an electronic engine control module (ECM) that controls a series of actuators on an internal combustion engine to ensure optimal engine performance. It does this by reading values from a multitude of sensors within the engine bay, interpreting the data using multidimensional performance maps and adjusting the engine actuators accordingly.

Current engine technology pertaining to electronically controlled engines comprises the following: (i) engines including an electronically controlled fuel injection system, (ii) using a super charger, or (iii) a turbocharger, or (iv) a combination of a supercharger and turbocharger, (v) fitted with a catalytic converter, or (vi) with a catalytic converter and DPM filters, and (vii) an exhaust pipe system designed to cool exhaust gasses and dampen sound. Electronically controlled engines are designed to manage fuel supply to achieve optimal combustion and engines operating at higher temperatures for more complete burning of fuel.

Use of a turbocharger and/or a supercharger pressurises air entering the engine to enhance fuel combustion. The cooler the compressed air is, the more effective the combustion will be (because cool air is denser—i.e. more molecules per volume—than hot air). Increased density provides increased oxygen which facilitates combustion. Therefore, cooling of the pressurised air is important. Superchargers are mechanically connected to the engine and provides pressurised air to the engine while the engine is running, thus achieving more efficient burning of fuel even at low engine RPM's (Revolutions Per Minute). Superchargers have no direct influence on a catalytic converter and DPM.

A turbocharger only compresses air at engine RPM higher then engine idle speeds. Since a turbocharger is driven by an engine's exhaust gas flow, it heats up close to the temperature of the exhaust gasses. Turbochargers also dampen the engine sound. The key difference between a turbocharger and a conventional supercharger is that a supercharger is mechanically driven by the engine, often through a belt connected to the crankshaft, whereas a turbocharger is powered by a turbine driven by the engine's exhaust gas. Compared to a mechanically driven supercharger, turbochargers tend to be more efficient, but less responsive. A most ideal effect on combustion is achieved by using both a supercharger and a turbocharger.

On 19 Jan. 2001 the Mine Safety and Health Administration (MSHA), an agency within the USA Department of Labour, published final diesel regulations for underground metal/non-metal and for underground coal mines. The underground metal/non-metal mine rule establishes a concentration limit for diesel particulate matter (DPM) and requires mine operators to use engineering or work practice controls to reduce DPM exposure to that limit. A final DPM concentration limit of 160 μg/m$^3$ became effective on 19 Jan. 2006. This standard is not achievable per se in Tier 3 engines and becomes increasingly difficult if engine fuel or engine filters are dirty.

Moreover, in order to increase health and safely in underground mines, the South African Mine Health and Safety Act, 1996 (Act No 29 of 1996)("the Act") provides that component surfaces, which are exposed to atmosphere, of all equipment and engines used in underground mining operations must have a surface temperature of less than 150° C. This also applies to engine emissions, which are prohibited from entering the atmosphere at a temperature of more than 150° C. In addition, the Act prescribes flame proofing requirements and provides that in all circumstances where there is a possibility of a flame being generated, or where component parts may reach a temperature of more than 150° C., such component parts must be encased in flame proof enclosures, which enclosures are themselves required to meet legislative standards.

Tier 3 engines have an operational temperature in the region of 96° C., which provides for better combustion and less fuel wastage. However, because of the high operational temperatures and optimal combustion functionality, emission gases from Tier 3 engines have a temperature range of 250° C. to 800° C. In order to comply with legislative and regulatory requirements, it is necessary to cool down such emission gases to below the prescribed 150° C.

Surfaces of a turbocharger and supercharger may be in direct contact with surrounding atmosphere and as such are required to have a surface temperature not exceeding 150° C. In order to achieve such a surface temperature, turbochargers are sometimes encapsulated in a surrounding cooling housing having a cooling liquid, which is in direct contact with an external surface of the turbocharger.

In order to cool down emission gases to below the prescribed 150° C., the gasses from Tier 3 electronically controlled combustion engines are typically forced through scrubbers to cool down the emission gasses. Scrubbers are typically either wet scrubbers or dry scrubbers. Surfaces of these components, which can also have extremely high temperatures, are in direct contact with the surrounding atmosphere.

Wet scrubbing involves direct contact of the particulate matter with a scrubbing solution, which can be water (for dust) or solutions of reagents that specifically target certain compounds. Wet scrubbers can also be used for heat recovery from hot emission gases by emission gas condensation. In this application, water from the scrubber drain is circulated through a cooler to nozzles at the top of the scrubber. Hot gas enters the scrubber at the bottom, and if the gas temperature is above the water dew point, it is initially cooled by evaporation of water drops. Further cooling cause water vapours to condense, adding to the amount of circulating water. Excess condensed water must continuously be removed from the circulating water.

A dry or semi-dry scrubbing system, unlike the wet scrubber, does not saturate an emission gas stream that is being treated with moisture. In some cases no moisture is added, while in others only an amount of moisture that can be evaporated in the emission gas without condensing is added. Dry scrubbing systems are typically used to remove acid gases (such as $SO_2$ and HCl) primarily from combustion sources. There are a number of dry scrubbing system designs, but all consist of two main sections or devices: (i) a device to introduce an emission gas sorbent material into a gas stream, and (ii) a particulate matter control device to remove reaction products, excess sorbent material, as well as any particulate matter already in the emission gas.

There are a number of disadvantages associated with current cooling systems of emission gasses in flame proof electronically controlled engines. In order to achieve sufficient cooling of the emission gasses from an engine emission temperature of 250° C. to 800° C. to the prescribed atmospheric emission temperature of not more than 150° C., flame proof engines are typically cooled down by a fluid that surrounds the manifold, turbocharger and/or exhaust cooler. In particular, one or all of the manifold, turbocharger and exhaust cooler may contain a cooling fluid where exhaust gasses run through a network of tubes or where exhaust gasses mix directly with a cooling fluid. The problem with these systems is that high temperatures of the emission gasses are required for optimal after-treatment of such gasses so as to reduce DPM emissions. Moreover, the catalytic converter's efficacy of after-treatment of emission gasses also increases at higher temperatures. If emission gasses are forcibly cooled down from as soon as they exit the engine, while passing through an engine manifold, turbocharger, catalytic converter and DPM filters, efficacy of after-treatment of gasses is reduced, resulting in higher DPM in the final exhaust gas to atmosphere.

A further disadvantage is associated with wet scrubbing in Tier 3 electronically controlled engines, which is that scrubber water needs to be refilled intermittently, as the water evaporates as a result of the high temperature ranges of the emission gasses. Moreover, currently used wet scrubbers cause environmental pollution, is difficult to maintain, is often bulky and causes difficulties and unreliability during operation.

It is accordingly an object of the present invention to provide an alternative cooling system for cooling emission gasses from flame proof electronically controlled internal combustion engines before the gasses are released to atmosphere, which cooling system is intended to replace conventionally used scrubbers and which will enable cooling of the emission gases to below 150° C.

SUMMARY OF THE INVENTION

According to a first aspect of the invention there is provided a cooling system suitable for cooling emission gasses from a fuel injection engine, wherein the fuel injection engine includes an exhaust manifold, a turbocharger, and a catalytic converter through which the emission gasses sequentially pass before they are released to atmosphere; the cooling system comprising an exhaust manifold housing for at least partially encasing the exhaust manifold, the exhaust manifold housing comprising an outer fluid chamber and an inner insulation chamber arranged intermediate the exhaust manifold and the fluid chamber, the exhaust manifold housing being configured to prevent rapid cooling of emission gasses as they pass through the exhaust manifold, while simultaneously shielding the exhaust manifold's external surface from atmosphere;

a turbocharger housing for at least partially encasing the turbocharger, the turbocharger housing comprising an outer fluid chamber and an inner insulation chamber arranged intermediate the turbocharger and the fluid chamber, the turbocharger housing being configured to prevent rapid cooling of emission gasses as they pass through the turbocharger, while simultaneously shielding the turbocharger's external surface from atmosphere;

a catalytic converter housing for at least partially encasing the catalytic converter, the catalytic converter housing comprising an outer fluid chamber and an inner insulation chamber arranged intermediate the catalytic converter and the fluid chamber, the catalytic converter housing being configured to prevent rapid cooling of emission gasses as they pass through the catalytic converter, while simultaneously shielding the catalytic converter's external surface from atmosphere; and an exhaust cooler adapted for rapidly cooling emission gasses exiting the catalytic converter before they are released to atmosphere, the cooling system being characterised therein that engine emission gasses are maintained at relatively high temperatures until after they pass through the catalytic converter, and thereafter undergoes rapid cooling as they pass through the exhaust cooler.

The cooling system may particularly be suitable for use in flame proof electronically controlled fuel injection engines. More particularly, the cooling system is particularly suitable for, although not limited to, use in Tier 3 electronically controlled diesel engines of trackless mining machinery.

The exhaust manifold housing may be configured fully to encase the exhaust manifold.

The exhaust manifold may comprise a series of parallel exhaust manifold discharge channels which are configured to collect exhaust gasses from multiple engine cylinders and distribute it into several parallel streams, and a manifold exhaust chamber arranged in flow communication with the discharge channels; and the exhaust manifold housing may complimentarily be configured independently to encase each exhaust manifold discharge channel, as well as the manifold exhaust chamber, the arrangement being such that each of the exhaust manifold discharge channels and the manifold exhaust chamber may be encased in a radially outwardly disposed fluid chamber, and an insulation chamber which is radially inwardly disposed from the fluid chamber and arranged intermediate the fluid chamber and the external surface of the exhaust manifold.

The fluid chamber of the exhaust manifold housing may include a fluid inlet and a fluid outlet for circulation of cooling fluid through the exhaust manifold housing.

The fluid chamber may be filled with water or any other suitable cooling fluid.

The insulation chamber of the exhaust manifold housing may be filled with ambient air, ceramics or other heat insulation material.

The turbocharger housing may be configured fully to encase the turbocharger.

The turbocharger housing may include an internal housing, defining the insulation chamber, and an external housing, the arrangement being such that a housing fluid chamber is defined between the internal housing and the external housing, while the turbocharger is receivable within the insulation chamber.

In particular, the internal housing may include a substantially planar base wall; two parallel opposing sidewalls extending upright from two opposite sides of the base wall; two parallel opposing end walls extending upright from two opposite ends of the base wall and extending between the opposing sidewalls.

The external housing may include a substantially planar base wall which is parallel to and disposed from the base wall of the internal housing; two parallel opposing sidewalls extending upright from two opposite sides of the base wall, the sidewalls of the external housing being parallel to and disposed from the sidewalls of the internal housing; two parallel opposing end walls extending upright from two opposite ends of the base wall and extending between the opposing sidewalls of the external housing, the end walls of the external housing being parallel to and disposed from the end walls of the internal housing.

The turbocharger housing may include a fluid bridge circumferentially extending about the turbocharger housing and resting atop the sidewalls and end walls of the internal and external housings such that the fluid bridge bridges a circumferential open top gap defined between neighbouring sidewalls and ends walls respectively of the internal and external housings. The fluid bridge may include a plurality of fluid apertures extending through the fluid bridge such that cooling fluid from the housing fluid chamber can pass through the apertures in the fluid bridge.

The insulation chamber may be configured fully to accommodate the turbocharger therein, the arrangement being such that ambient air or any other suitable insulation material separates the external surface of the turbocharger from the surrounding fluid chamber.

The turbocharger housing also may include a fluid cooled lid, which is removably locatable atop the sidewalls and end walls of the internal and external housings such that it is seated atop the fluid bridge and arranged in flow communication with the housing fluid chamber. In particular, the lid may comprise a substantially planar lid floor, and a substantially planar lid roof which is disposed parallel to and spaced from the lid floor such that a lid fluid chamber is defined between the lid floor and the lid roof. The lid floor may terminate in a series of peripherally disposed lid fluid apertures extending through the lid floor and complimentarily configured to cooperate with the fluid apertures extending through the fluid bridge, the arrangement being such that when the lid is seated atop the fluid bridge, cooling fluid passes through the lid fluid chamber, through the lid fluid apertures and the apertures in the fluid bridge, and into the housing fluid chamber. The lid fluid chamber and the housing fluid chamber together define the fluid chamber of the turbocharger housing.

The turbocharger housing may include a fluid inlet and a fluid outlet. The fluid inlet may be arranged in flow communication with the lid fluid chamber, while the fluid outlet may be arranged in flow communication with the housing fluid chamber. It will, however, be appreciated that, depending on installation, the fluid inlet may be arranged in flow communication with the housing fluid chamber, while the fluid outlet may be arranged in flow communication with the lid fluid chamber.

The turbocharger housing may include a number of apertures extending through the sidewalls and end walls of the housing and configured to accommodate different elements of the turbocharger protruding through the walls of the housing.

The catalytic converter housing may be configured fully to encase the catalytic converter.

The catalytic converter housing may be a substantially cylindrical housing and may include a cylindrical internal housing, defining the insulation chamber, and terminating at one end thereof in a first end wall; and a co-axial, radially outwardly disposed cylindrical external housing, terminating at one end thereof in a second end wall which is parallel to and axially disposed from the first end wall; the arrangement being such that a fluid chamber is defined between the internal housing and the external housing, while the catalytic converter is receivable within the insulation chamber. The first and second end walls may include axially aligned inlet apertures for allowing inlet of emission gasses from the turbocharger into the catalytic converter.

The catalytic converter housing may include a fluid seal which radially extends between the internal and external housings for sealing the fluid chamber.

The insulation chamber may be configured fully to accommodate the catalytic converter therein, the arrangement being such that ambient air, ceramics or other heat insulation material separates the external surface of the catalytic converter from the surrounding fluid chamber.

The catalytic converter housing may terminate in one open end for receiving the catalytic converter within the insulation chamber. The catalytic converter housing may include a removable housing plate which is seated against and connectable to the fluid seal once the catalytic converter is in place. The housing plate may include an outlet aperture for allowing outlet of emission gasses from the catalytic converter housing.

The catalytic converter housing may include a fluid inlet and a fluid outlet for allowing circulation of cooling fluid through the fluid chamber.

The exhaust cooler may comprise
at least one elongate cooling fin which comprises an internal channel having an inlet and an outlet; and a co-axial, outwardly disposed external channel having an inlet and an outlet, such that a chamber is defined between the internal and the external channels;
the arrangement being such that hot emission gasses from the engine pass through one channel between the inlet and the outlet, while simultaneously cooling fluid passes through the other channel between the inlet and the outlet such that thermal energy from the hot emission gasses are transferred to the cooling fluid;
the arrangement further being such that ambient air flow may be facilitated over the cooling fin for increased cooling efficiency, the exhaust cooler being adapted for receiving emission gases within a temperature range of 250° C. to 800° C., and cooling it down using both cooling fluid and ambient air flow to a temperature not exceeding 150° C. before the gases are released to atmosphere.

The exhaust cooler may comprise a base formation; a geometrically spaced, parallel roof formation; and a plurality of cooling fins extending parallel to each other between the roof formation and the base formation, the cooling fins being spaced apart to define air flow channels between neighbouring cooling fins, the arrangement being such that ambient air flow may be forced through the cooling fins via the air flow channels. In a preferred embodiment of the invention, the internal channel of each cooling fin may be a gas channel for channelling hot engine emission gases, the internal channel having a gas inlet in the roof formation and a gas outlet in the base formation; while the external channel of each cooling fin may be a cooling fluid channel for channelling cooling fluid, the external channel having a cooling fluid inlet and a cooling fluid outlet. It will, however, be appreciated that an alternative embodiment of the invention provides that each cooling fin comprises an external gas channel for channelling hot engine emission gases; and an internal cooling fluid channel for channelling cooling fluid.

In a preferred embodiment, hot emission gasses from the engine pass through the internal gas channel of each cooling fin, while cooling fluid passes through the external fluid channel such that thermal energy from the hot emission gasses is transferred through convection heat transfer to the cooling fluid, while simultaneously ambient air may flow over and between the cooling fins, thus enabling additional heat removal from the external channel. In one embodiment of the invention, the external cooling fluid channel may have a cooling fluid inlet in the base formation and a cooling fluid outlet in the roof formation, such that the hot emission gasses flow in one direction from the roof formation to the base formation, while the cooling fluid flows in an opposite direction from the base formation to the roof formation. However, it will be appreciated that flow direction of the cooling fluid may be altered such that the cooling fluid may flow in the same direction as the emission gasses. In this alternative embodiment, the external cooling fluid channel may have a cooling fluid inlet in the roof formation and a cooling fluid outlet in the base formation.

The roof formation may include a primary gas inlet; and a gas inlet manifold, which is operatively associated with the primary gas inlet, as well as with the gas inlet of each internal gas channel, such that emission gas enters the exhaust cooler through the primary gas inlet and is dissipated to the internal gas channel of each cooling fin through the gas inlet manifold.

The base formation may include a primary gas outlet; and a gas outlet manifold, which is operatively associated with the primary gas outlet, as well as with the gas outlet of each internal gas channel, such that emission gas exits the exhaust cooler through the gas outlet of each internal gas channel and is channelled to the primary gas outlet through the gas outlet manifold.

The external cooling fluid channel of each cooling fin may terminate at opposite ends thereof in the roof and base formations respectively such that cooling fluid circulates through the roof formation, external channels and the base formation, the arrangement being such that the gas inlet manifold, internal gas channels and gas outlet manifold are encased within peripherally bordering cooling fluid.

The exhaust cooler also may include a cooling fan arranged adjacent the exhaust cooler and positioned for blowing or sucking ambient air through the cooling fins. The cooling fan may be actuated hydraulically, pneumatically or mechanically.

The exhaust cooler may be positioned to receive emission gasses after they have passed through the catalytic converter and one or more diesel particulate filters.

The exhaust cooler may include its own cooling fluid reservoir, heat exchanger and pumping means for pumping cooling fluid from the reservoir, through the exhaust cooler and the heat exchanger and back to the reservoir, the arrangement being such that heat energy from the cooling fluid is transferred to ambient air through the heat exchanger. In a preferred embodiment of the invention, the cooling fluid may be water and the exhaust cooler may be linked to an engine water circulation system, which includes its own water reservoir, engine radiator and pumping means, wherein the engine radiator transfers heat energy from the engine cooling water to ambient air. In this embodiment, the water which is channelled through the exhaust cooler to cool the emission gasses is also channelled through the engine radiator.

The exhaust cooler also may include a number of elongate, twisted channel inserts, with one channel insert being removably located within each of the gas channels, the arrangement being such that the channel inserts cause turbulent flow of the emission gasses while it passes through the gas channels, thus increasing emission gas contact with the cooling fluid channel and accelerated gas cooling times.

Each channel insert may be twisted along its longitudinal axis such that it causes helical turbulence in the emission gas flow within the gas channel.

The fuel injection engine also may include a supercharger, and the cooling system may include a supercharger housing for at least partially encasing the supercharger, the supercharger housing comprising an outer fluid chamber and an inner insulation chamber arranged intermediate the supercharger and the fluid chamber, the supercharger housing being configured for shielding the supercharger's external surface from atmosphere.

The supercharger housing may be configured fully to encase the supercharger.

The supercharger housing may include an internal housing, defining the insulation chamber, and an external housing, the arrangement being such that a housing fluid chamber is defined between the internal housing and the external housing, while the supercharger is receivable within the insulation chamber.

In particular, the internal housing may include a substantially planar base wall; two parallel opposing sidewalls extending upright from two opposite sides of the base wall; two parallel opposing end walls extending upright from two opposite ends of the base wall and extending between the opposing sidewalls.

The external housing may include a substantially planar base wall which is parallel to and disposed from the base wall of the internal housing; two parallel opposing sidewalls extending upright from two opposite sides of the base wall, the sidewalls of the external housing being parallel to and disposed from the sidewalls of the internal housing; two parallel opposing end walls extending upright from two opposite ends of the base wall and extending between the opposing sidewalls of the external housing, the ends walls of the external housing being parallel to and disposed from the end walls of the internal housing.

The supercharger housing may include a fluid bridge circumferentially extending about the supercharger housing and resting atop the sidewalls and end walls of the internal and external housings such that the fluid bridge bridges a circumferential open top gap defined between neighbouring sidewalls and ends walls respectively of the internal and external housings. The fluid bridge may include a plurality of fluid apertures extending through the fluid bridge such that cooling fluid from the housing fluid chamber can pass through the apertures in the fluid bridge.

The insulation chamber may be configured fully to accommodate the supercharger therein, the arrangement being such that ambient air or other heat insulation material separates the external surface of the supercharger from the surrounding fluid chamber.

The supercharger housing also may include a fluid cooled lid, which is removably locatable atop the sidewalls and end walls of the internal and external housings such that it is seated atop the fluid bridge and arranged in flow communication with the housing fluid chamber. In particular, the lid may comprise a substantially planar lid floor, and a substantially planar lid roof which is disposed parallel to and spaced from the lid floor such that a lid fluid chamber is defined between the lid floor and the lid roof. The lid floor may terminate in a series of peripherally disposed lid fluid apertures extending through the lid floor and complimentarily configured to cooperate with the fluid apertures extending through the fluid bridge, the arrangement being such that when the lid is seated atop the fluid bridge, cooling fluid passes through the lid fluid chamber, through the lid fluid apertures and the apertures in the fluid bridge, and into the housing fluid chamber. The lid fluid chamber and the housing fluid chamber together define the fluid chamber of the supercharger housing.

The supercharger housing may include a fluid inlet and a fluid outlet. The fluid inlet may be arranged in flow communication with the lid fluid chamber, while the fluid outlet may be arranged in flow communication with the housing fluid chamber. It will, however, be appreciated that, depending on installation, the fluid inlet may be arranged in flow communication with the housing fluid chamber, while the fluid outlet may be arranged in flow communication with the lid fluid chamber.

The supercharger housing may include a number of apertures extending through the sidewalls and end walls of the housing and configured to accommodate different elements of the supercharger protruding through the walls of the housing.

According to a further aspect of the invention there is provided a cooling system suitable for cooling emission gasses from a fuel injection engine, wherein the fuel injection engine includes an exhaust manifold; the cooling system comprising an exhaust manifold housing for at least partially encasing the exhaust manifold, the exhaust manifold housing comprising an outer fluid chamber and an inner insulation chamber arranged intermediate the exhaust manifold and the fluid chamber, the exhaust manifold housing being configured to prevent rapid cooling of emission gasses as they pass through the exhaust manifold, while simultaneously shielding the exhaust manifold's external surface from atmosphere; and an exhaust cooler adapted for rapidly cooling emission gasses before they are released to atmosphere, the cooling system being characterised therein that engine emission gasses are maintained at relatively high temperatures until they pass through the exhaust cooler, when the emission gasses undergo rapid cooling.

According to a further aspect of the invention there is provided a cooling system suitable for cooling emission gasses from a fuel injection engine, wherein the fuel injection engine includes a turbocharger; the cooling system comprising a turbocharger housing for at least partially encasing the turbocharger, the turbocharger housing comprising an outer fluid chamber and an inner insulation chamber arranged intermediate the turbocharger and the fluid chamber, the turbocharger housing being configured to prevent rapid cooling of emission gasses as they pass through the turbocharger, while simultaneously shielding the turbocharger's external surface from atmosphere; and an exhaust cooler adapted for rapidly cooling emission gasses before they are released to atmosphere, the cooling system being characterised therein that engine emission gasses are maintained at relatively high temperatures until they pass through the exhaust cooler, when the emission gasses undergo rapid cooling.

According to a further aspect of the invention there is provided a cooling system suitable for cooling emission gasses from a fuel injection engine, wherein the fuel injection engine includes a catalytic converter; the cooling system comprising a catalytic converter housing for at least partially encasing the catalytic converter, the catalytic converter housing comprising an outer fluid chamber and an inner insulation chamber arranged intermediate the catalytic converter and the fluid chamber, the catalytic converter housing being configured to prevent rapid cooling of emission gasses as they pass through the catalytic converter, while simultaneously shielding the catalytic converter's external surface from atmosphere; and an exhaust cooler adapted for rapidly cooling emission gasses exiting the catalytic converter before they are released to atmosphere, the cooling system being characterised therein that engine emission gasses are maintained at relatively high temperatures until they pass through the exhaust cooler, when the emission gasses undergo rapid cooling.

According to a further aspect of the invention there is provided an exhaust manifold suitable for use in a fuel injection engine, wherein the exhaust manifold comprises an exhaust manifold housing for at least partially encasing the exhaust manifold, the exhaust manifold housing comprising an outer fluid chamber and an inner insulation chamber arranged intermediate the exhaust manifold and the fluid chamber, the exhaust manifold housing being configured to prevent rapid cooling of emission gasses as they pass through the exhaust manifold, while simultaneously shielding the exhaust manifold's external surface from atmosphere.

According to a further aspect of the invention there is provided a turbocharger suitable for use in a fuel injection engine, wherein the turbocharger comprises a turbocharger housing for at least partially encasing the turbocharger, the turbocharger housing comprising an outer fluid chamber and an inner insulation chamber arranged intermediate the turbocharger and the fluid chamber, the turbocharger housing being configured to prevent rapid cooling of emission gasses as they pass through the turbocharger, while simultaneously shielding the turbocharger's external surface from atmosphere.

According to a further aspect of the invention there is provided a catalytic converter suitable for use in a fuel injection engine, wherein the catalytic converter comprises a catalytic converter housing for at least partially encasing the catalytic converter, the catalytic converter housing comprising an outer fluid chamber and an inner insulation chamber arranged intermediate the catalytic converter and the fluid chamber, the catalytic converter housing being configured to prevent rapid cooling of emission gasses as they pass through the catalytic converter, while simultaneously shielding the catalytic converter's external surface from atmosphere.

According to a further aspect of the invention there is provided an exhaust cooler suitable for use in a fuel injection engine, wherein the exhaust cooler comprises at least one elongate cooling fin which comprises an internal channel having an inlet and an outlet; and a co-axial, outwardly disposed external channel having an inlet and an outlet, such that a chamber is defined between the internal and the external channels;

the arrangement being such that hot emission gasses from the engine pass through one channel between the inlet and the outlet, while simultaneously cooling fluid passes through the other channel between the inlet and the outlet such that thermal energy from the hot emission gasses are transferred to the cooling fluid;

the arrangement further being such that ambient air flow may optionally be facilitated over the cooling fin for increased cooling efficiency, the exhaust cooler being adapted for receiving emission gases within a temperature range of 250° C. to 800° C., and cooling it down using both cooling fluid and ambient air flow to a temperature not exceeding 150° C. before the gases are released to atmosphere.

According to a further aspect of the invention there is provided a supercharger suitable for use in a fuel injection engine, wherein the supercharger comprises a supercharger housing for at least partially encasing the supercharger, the supercharger housing comprising an outer fluid chamber and an inner insulation chamber arranged intermediate the supercharger and the fluid chamber, the supercharger housing being configured for shielding the supercharger's external surface from atmosphere.

SPECIFIC EMBODIMENT OF THE INVENTION

The invention will now further be described by way of non-limiting example only and with reference to the accompanying drawings in which FIG. 1 is a schematic illustration from one angle of rotation of an engine assembly, illustrating positioning of the manifold, turbocharger, catalytic converter and exhaust cooler according to the invention;

Figure 1:
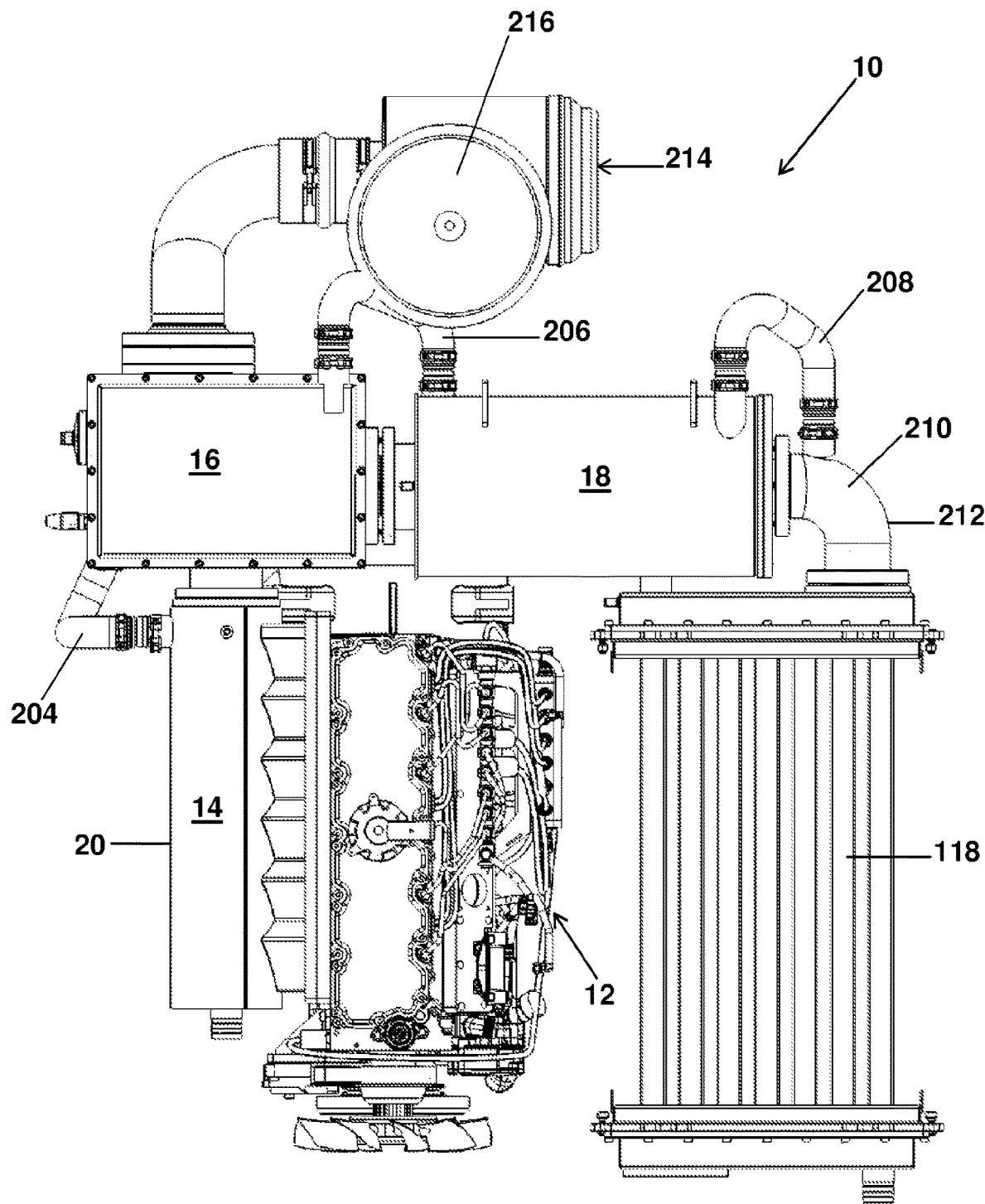
Figure 2:
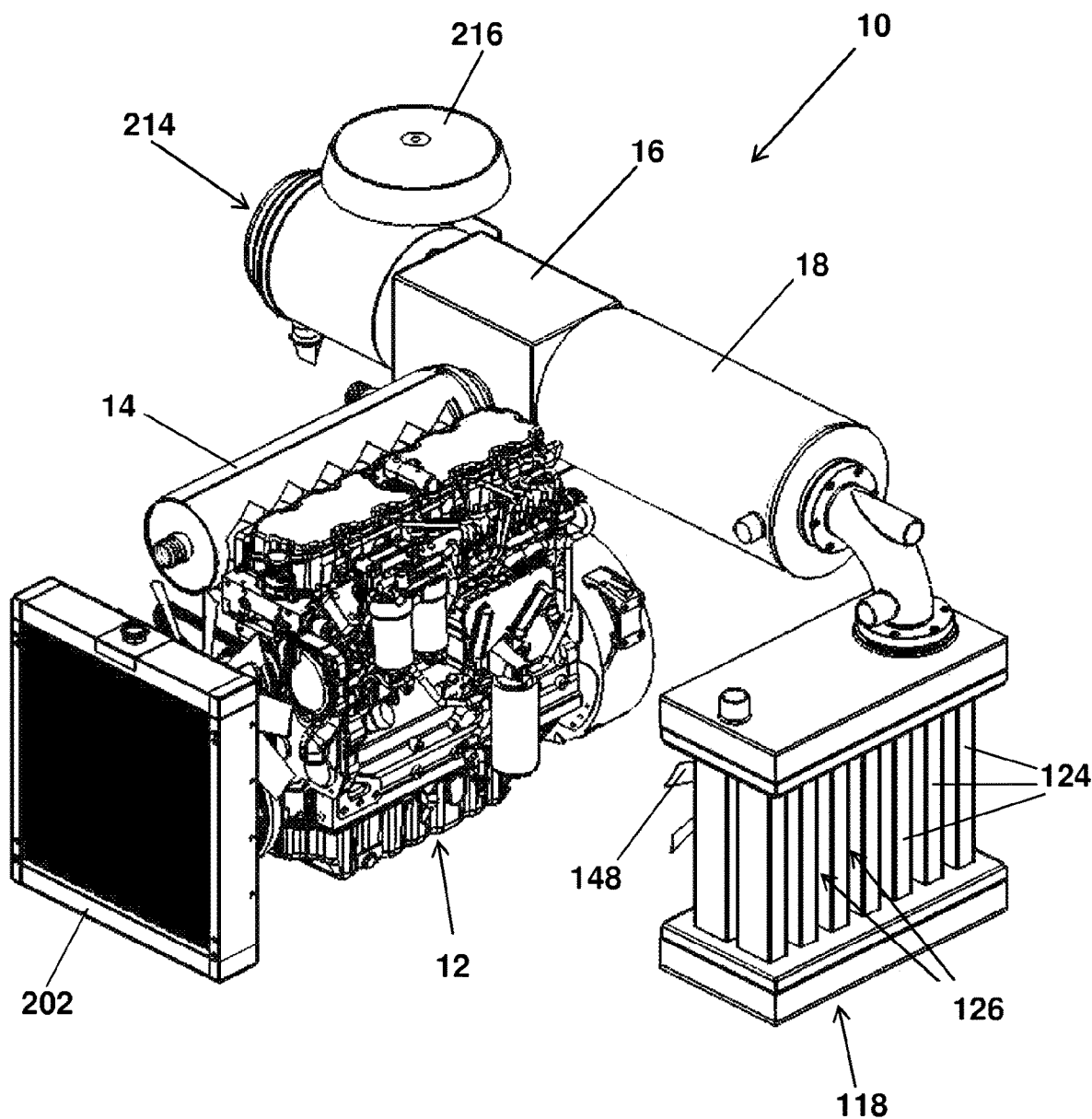
FIG. 2 is a schematic illustration from a different angle of rotation of the engine assembly of FIG. 1.
Figure 3:
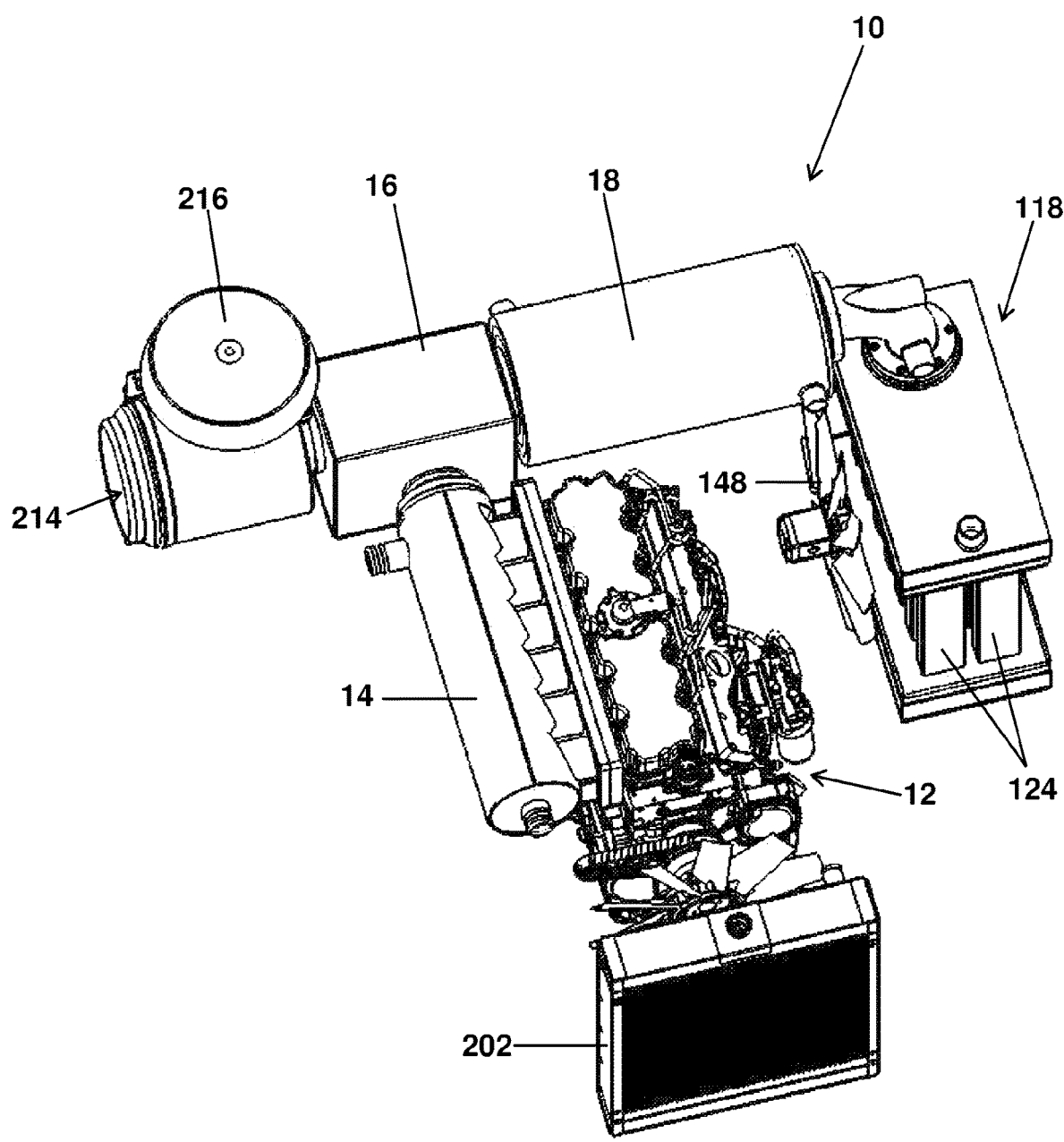
FIG. 3 is a schematic illustration from yet another angle of rotation of the engine assembly of FIGS. 1 and 2, more clearly illustrating positioning of the cooling fan used in association with the exhaust cooler.
Figure 4:
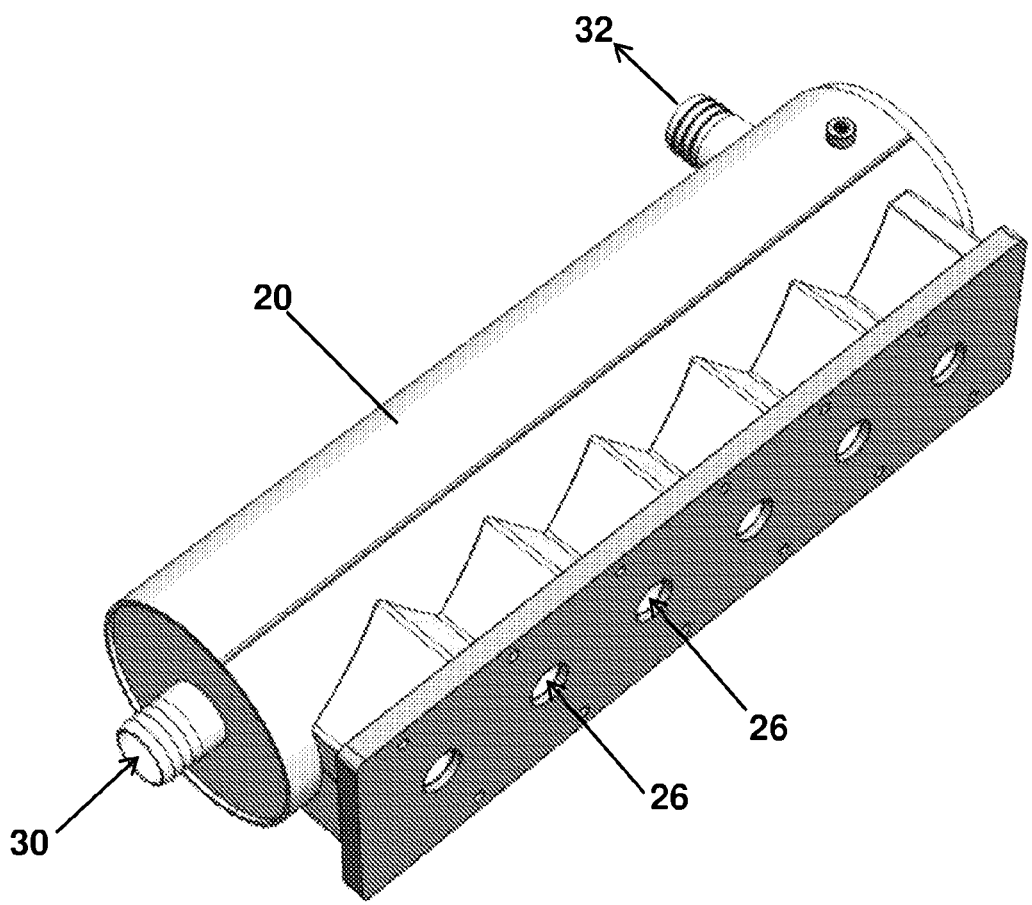
FIG. 4 is a perspective view of a manifold housing according to the invention.
Figure 5:
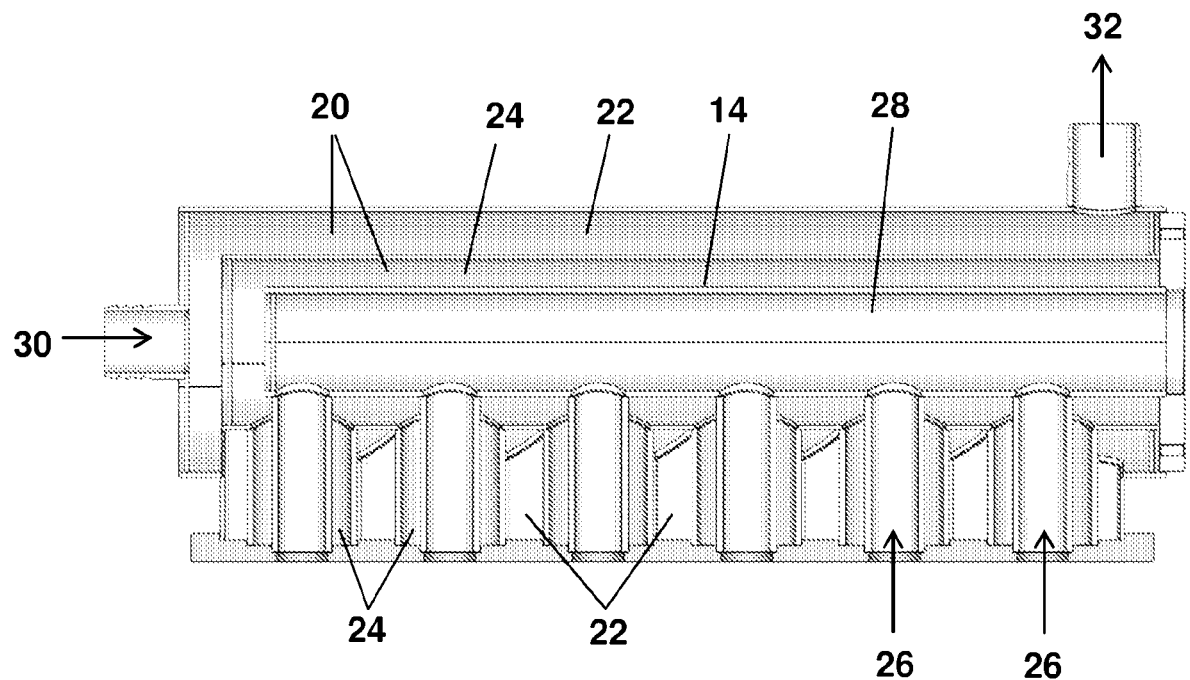
FIG. 5 is a sectional side elevation of the manifold and manifold housing of FIG. 4.
Figure 6:
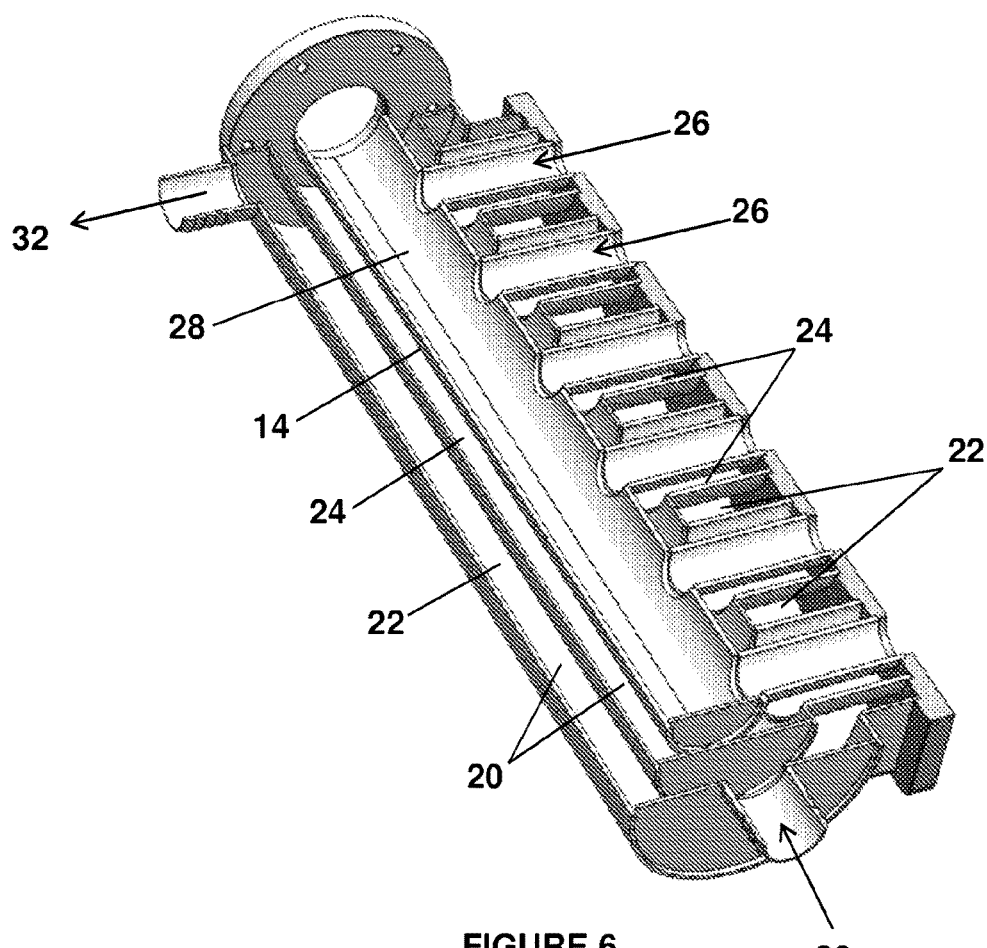
FIG. 6 is a sectional perspective elevation of the manifold and manifold housing of FIG. 4, sectioned along the longitudinal axis.
Figure 7:
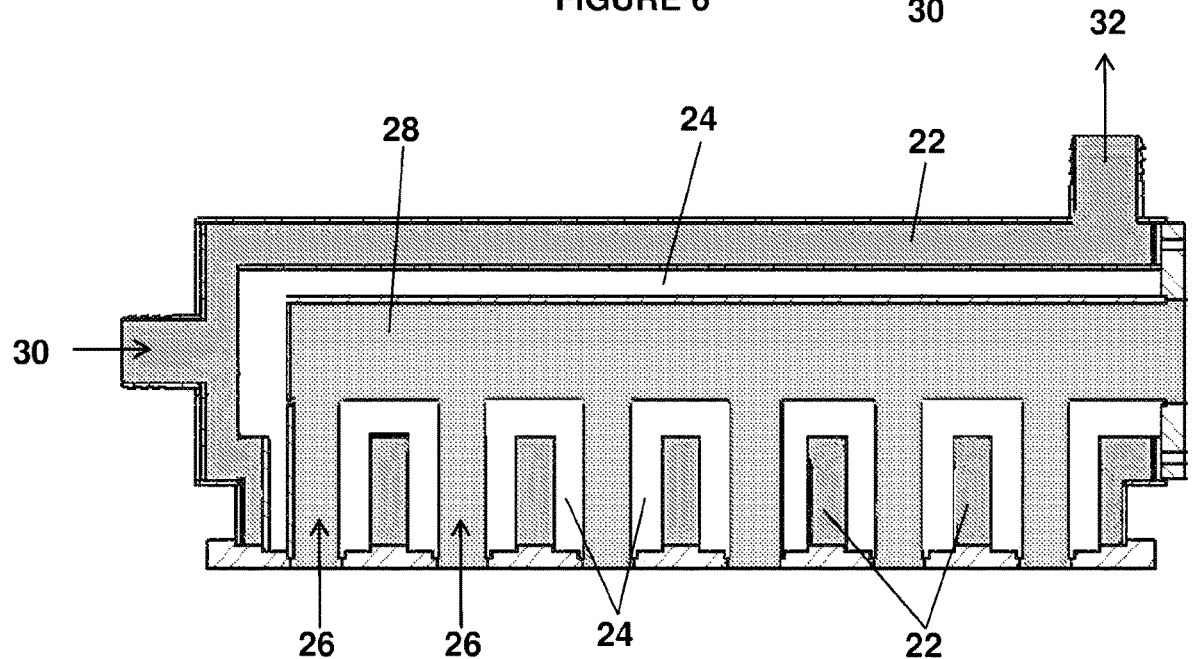
FIG. 7 is a diagrammatic sectional side elevation of the manifold and manifold housing of FIG. 4, sectioned along the longitudinal axis.

The invention provides a cooling system [10] suitable for cooling emission gasses from a fuel injection engine [12], wherein the fuel injection engine [12] includes an exhaust manifold [14], a turbocharger [16], and a catalytic converter [18] through which the emission gasses sequentially pass before they are released to atmosphere. The cooling system [10] is characterised therein that engine emission gasses are maintained at relatively high temperatures until after they pass through the catalytic converter [18], and thereafter undergoes rapid cooling as they pass through an exhaust cooler [118].

The cooling system [10] is particularly suitable for use in flame proof electronically controlled fuel injection engines [12]. More particularly, the cooling system [10] is particularly suitable for, although not limited to, use in Tier 3 electronically controlled diesel engines of trackless mining machinery.

The cooling system [10] comprises an exhaust manifold housing [20] for at least partially encasing the exhaust manifold [14], the exhaust manifold housing [20] comprising an outer fluid chamber [22] and an inner insulation chamber [24] arranged intermediate the exhaust manifold [14] and the fluid chamber [22]. The exhaust manifold housing [20] is configured to prevent rapid cooling of emission gasses as they pass through the exhaust manifold [14], while simultaneously shielding the exhaust manifold's external surface from atmosphere.

It will be appreciated that an exhaust manifold [14] typically comprises a series of exhaust manifold discharge channels [26] which are configured to collect exhaust gasses from multiple engine cylinders and distribute it into several parallel streams, and a manifold exhaust chamber [28] within which the exhaust manifold discharge channels [26] terminate and from where the emission gasses are further channelled through the engine's gas after-treatment and cooling system [10]. Outer surfaces of an exhaust manifold [14] generally reach very high temperatures, which is why it is a requirement in flame proof engines (such as those used in underground mining applications where flammable gasses and/or mining surfaces are present) to cool down such outer surfaces with a cooling fluid, such as water, to a temperature not exceeding 150° C. In prior art applications, the exhaust manifold [14] is sometimes at least partially encased within a cooling housing comprising a fluid chamber, the arrangement being such that fluid in the fluid chamber is in direct contact with an external surface of the exhaust manifold [14], including the exhaust manifold discharge channels [26] and manifold exhaust chamber [28]. This arrangement has the advantage of cooling the exhaust manifold's external surface as prescribed, but carries with it a disadvantage in that it also starts cooling down the engine emission gasses as they pass through the exhaust manifold [14], resulting in reduced efficacy of after-treatment of the emission gasses and a resultant higher presence of DPM and other toxic components.

The invention provides a modified exhaust manifold housing [20] which is complimentarily configured independently to encase each exhaust manifold discharge channel [26], as well as the manifold exhaust chamber [28], the arrangement being such that each of the exhaust manifold discharge channels [26] and the manifold exhaust chamber [28] are encased in a radially outwardly disposed fluid chamber [22], and an insulation chamber [24] which is radially inwardly disposed from the fluid chamber [22] and arranged intermediate the fluid chamber [22] and the external surface of the exhaust manifold [14]. The result of this configuration is that while the exhaust manifold housing [20] cools the exhaust manifold's external surface to below 150° C., it has the advantage that it does not also cool down the emission gasses as they pass through the exhaust manifold [14], thus maintaining the emission gas temperatures in the optimal temperature ranges for increased efficacy of after-treatment of the emission gasses, as well as optimal functioning of the catalytic converter [18].

The fluid chamber [22] includes a fluid inlet [30] and a fluid outlet [32] for circulation of cooling fluid through the exhaust manifold housing [20].

The cooling system [10] also comprises a turbocharger housing [34] for at least partially encasing the turbocharger [16]. The turbocharger housing [34] comprises an outer fluid chamber [36] and an inner insulation chamber [38] arranged intermediate the turbocharger [16] and the fluid chamber [36]. The turbocharger housing [34] is configured to prevent rapid cooling of emission gasses as they pass through the turbocharger [16], while simultaneously shielding the turbocharger's external surface from atmosphere.

Figure 8:
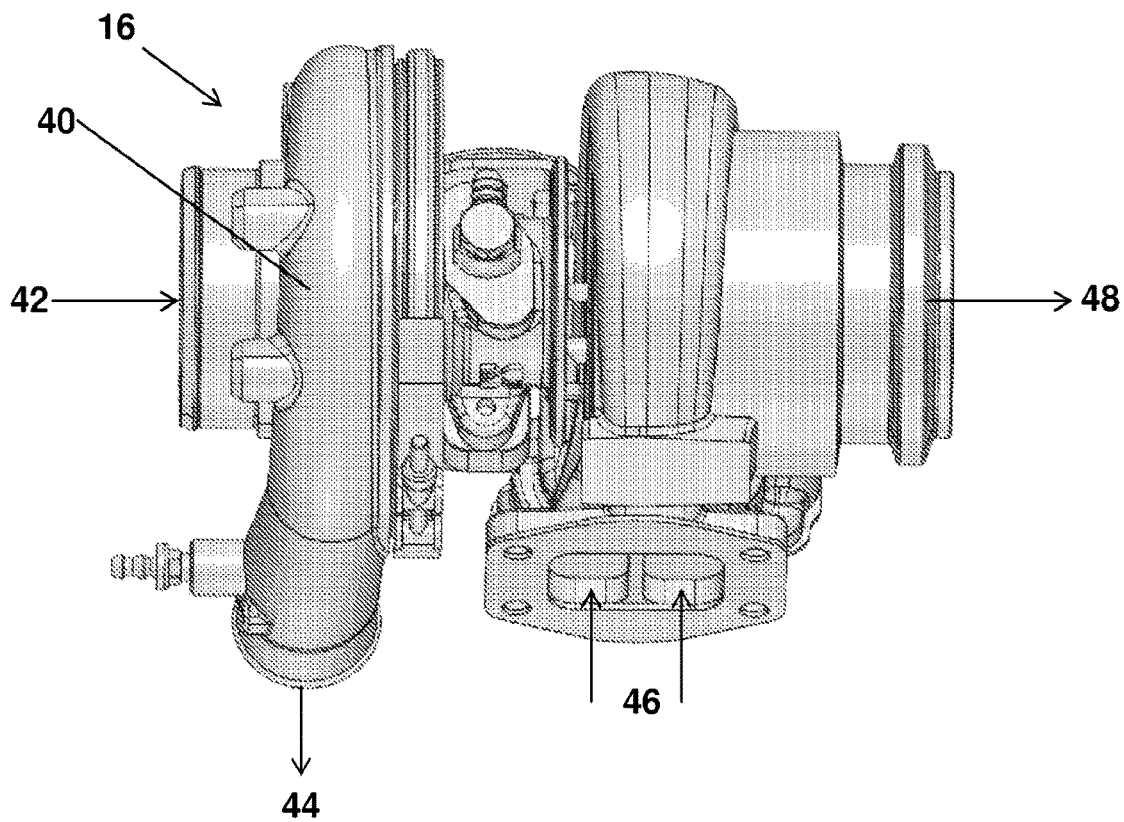
FIG. 8 is a perspective view of a conventional turbocharger.

FIG. 8 illustrates a turbocharger [16]. The skilled artisan will appreciate that a turbocharger [16] is a turbine-driven forced induction device that increases an internal combustion engine's efficiency and power output by forcing extra air into an engine combustion chamber. This improvement over a naturally aspirated engine's power output is due to the fact that the turbocharger [16] can force more air—and proportionately more fuel—into the combustion chamber than atmospheric pressure alone. The turbocharger's compressor [40] draws in ambient air [214] through an air filter [216] and air inlet [42], and compresses it before it exits through outlet [44] into an engine's intake manifold [200] at increased pressure. This results in a greater mass of air entering the cylinders on each intake stroke. The power needed to spin the centrifugal compressor [40] is derived from the kinetic energy of the engine's exhaust gases. A turbocharger [16] can also be used to increase fuel efficiency without increasing power. This is achieved by recovering waste energy in the exhaust gasses through exhaust gas inlet [46] and feeding it back into the engine intake through outlet [48]. By using this otherwise wasted energy to increase the mass of air, it becomes easier to ensure that all fuel is burned before being vented at the start of an exhaust stage. The increased temperature from the higher pressure gives a higher efficiency.

Figure 9:
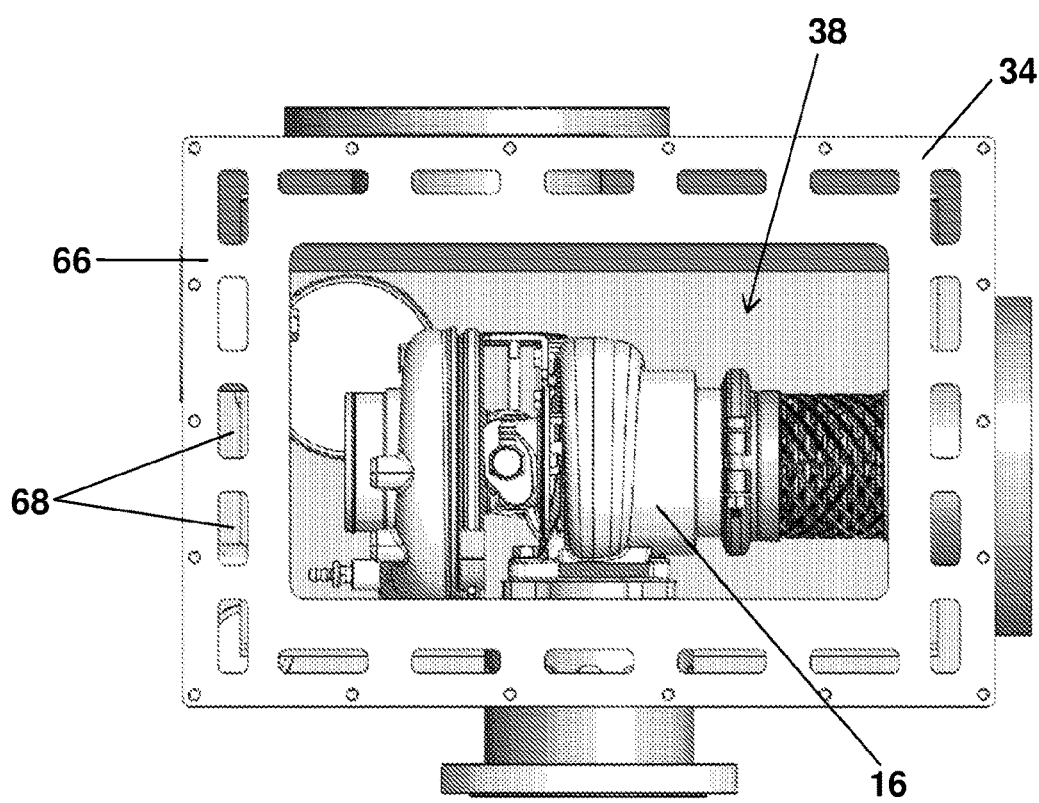
FIG. 9 is a plan view from above of a turbocharger housing according to the invention, illustrating location of the turbocharger of FIG. 8 within the turbocharger housing.
Figure 10:
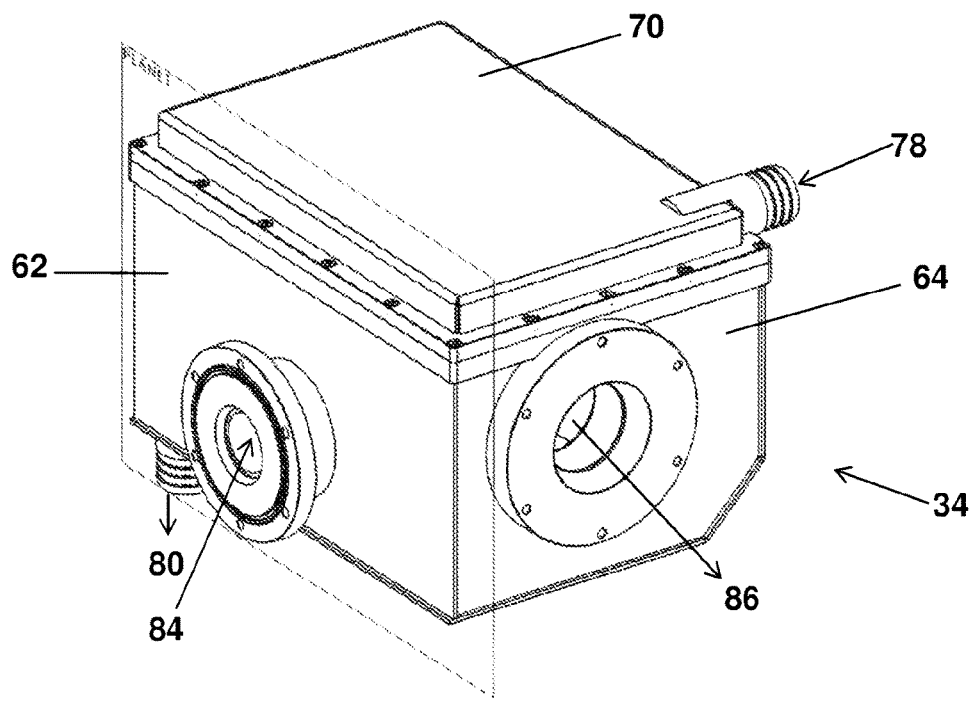
FIG. 10 is an assembled perspective view of a turbocharger housing according to the invention, with the cooled lid in a closed position.
Figure 11:
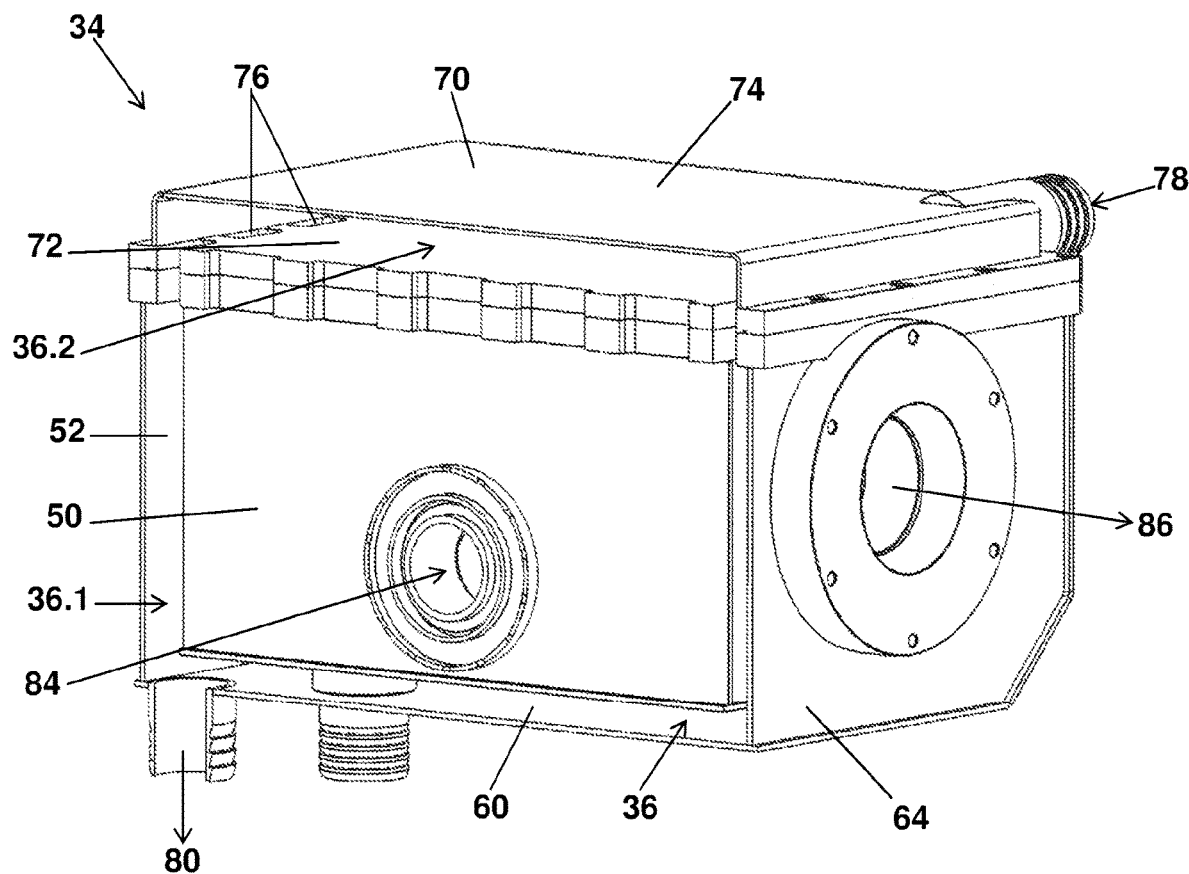
FIG. 11 is a partially sectioned perspective view of the turbocharger housing of FIG. 10, sectioned along Plane 1 of FIG. 10.
Figure 12:
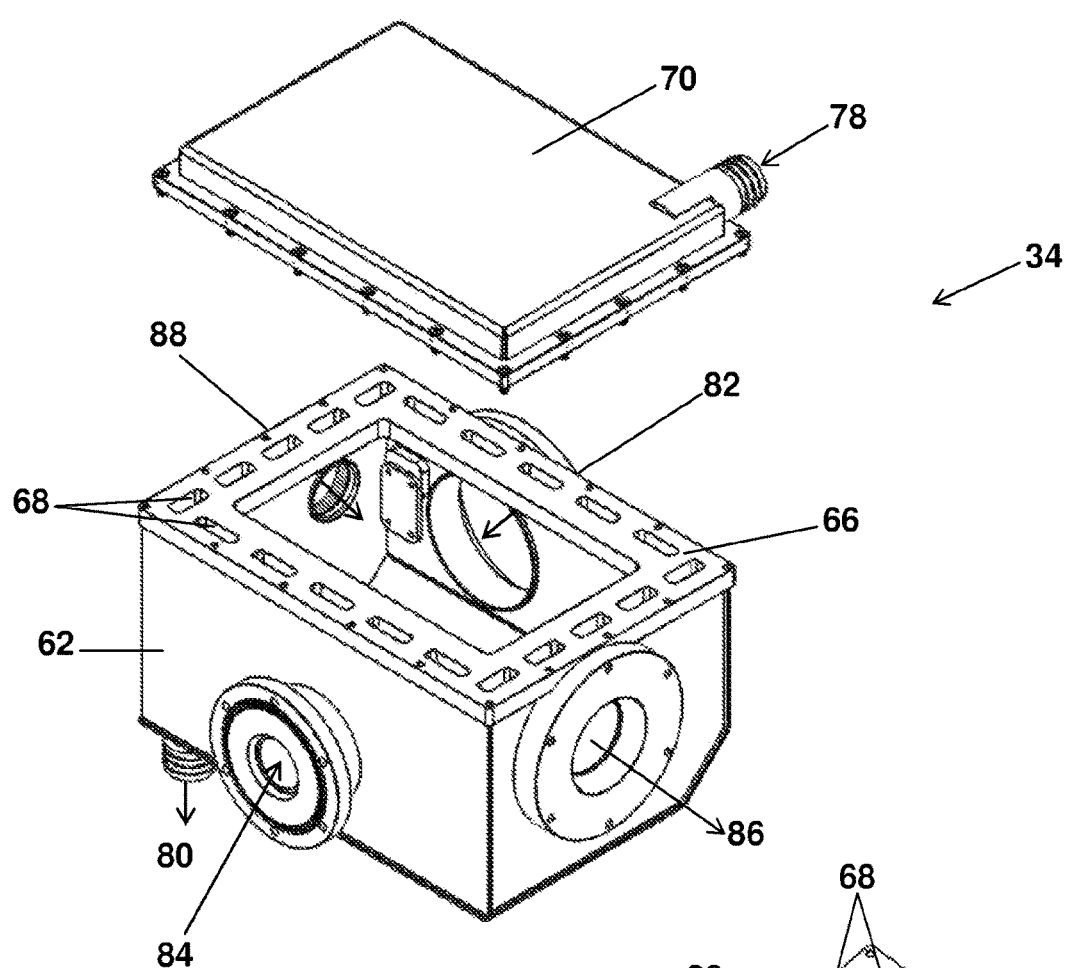
FIG. 12 is an exploded perspective view of the turbocharger housing of FIG. 10, with the cooled lid in an open position.
Figure 13:
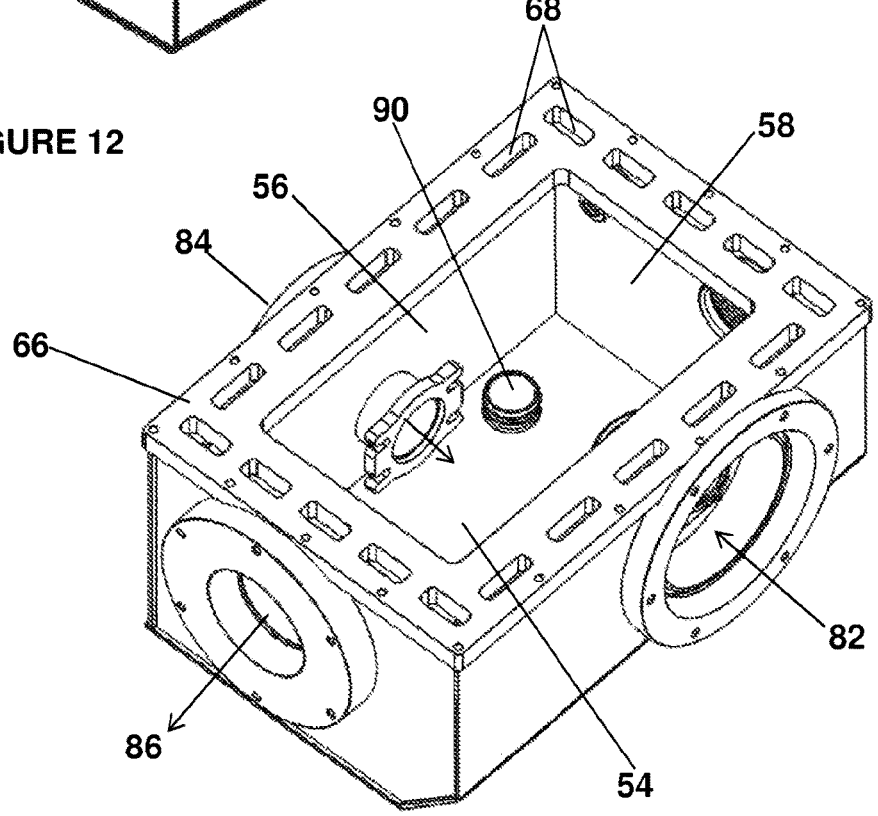
FIG. 13 is a perspective view from a different angle of rotation of the turbocharger housing of FIG. 10, with the lid removed.
Figure 14:
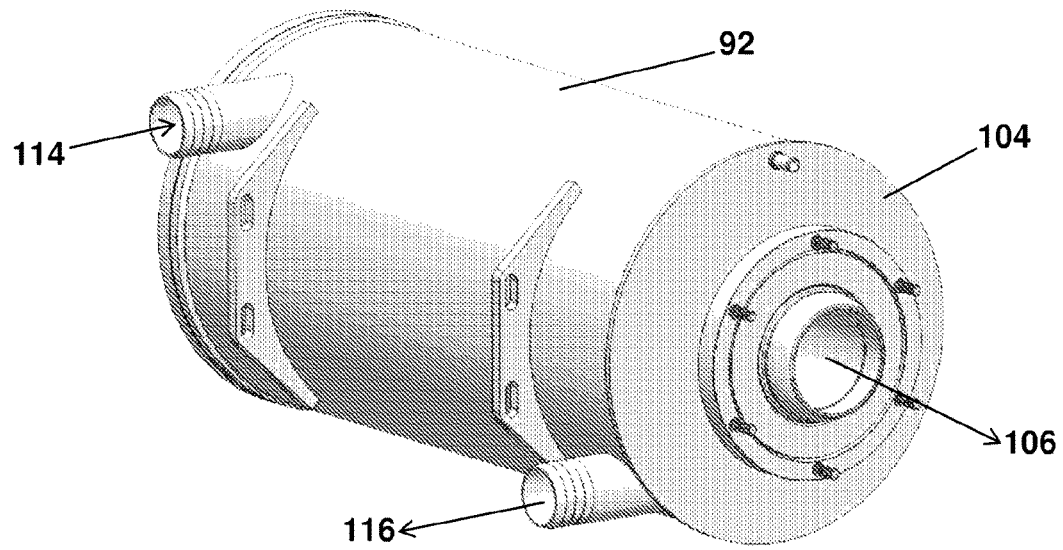
FIG. 14 is a perspective view of a catalytic converter housing according to the invention.
Figure 15:
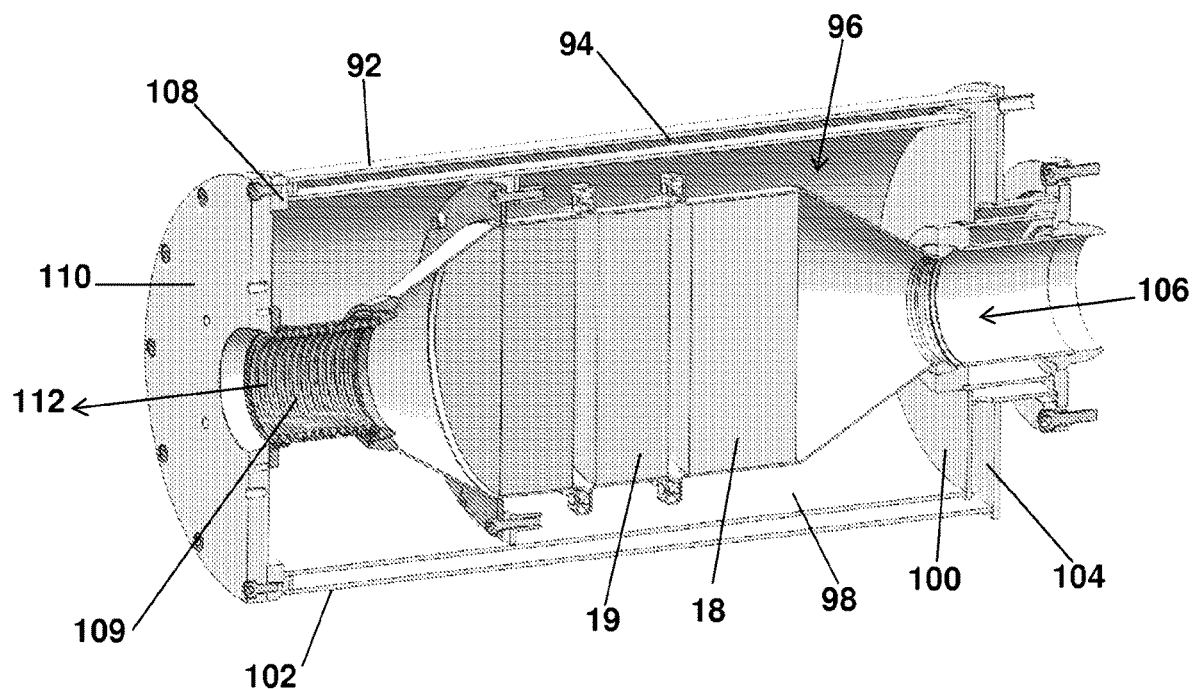
FIG. 15 is a sectional perspective view of the catalytic converter housing of FIG. 14, illustrating positioning of a catalytic converter within the housing.
Figure 16:
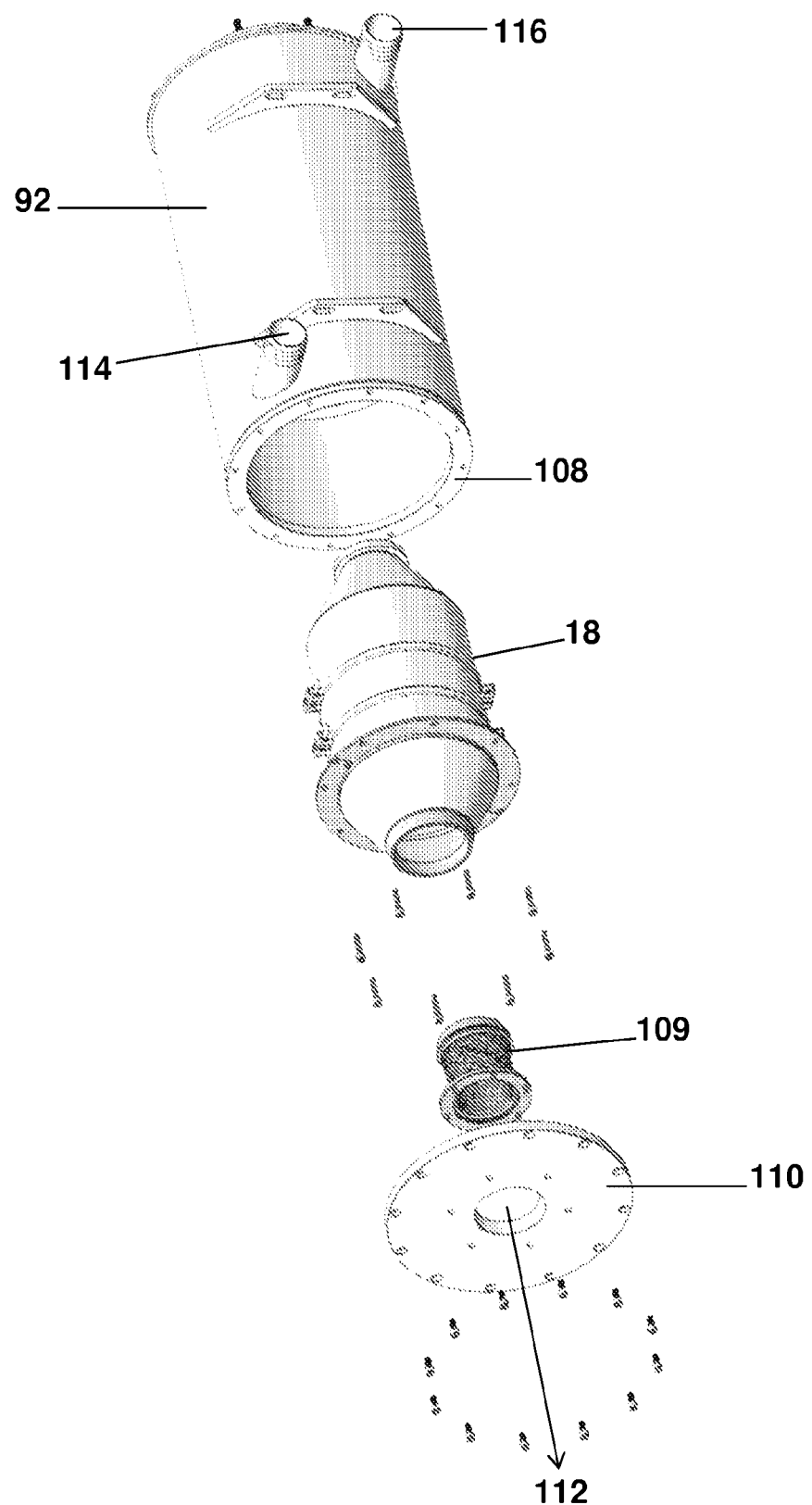
FIG. 16 is an exploded perspective view of the catalytic converter housing of FIG. 14, including a catalytic converter.
Figure 17:
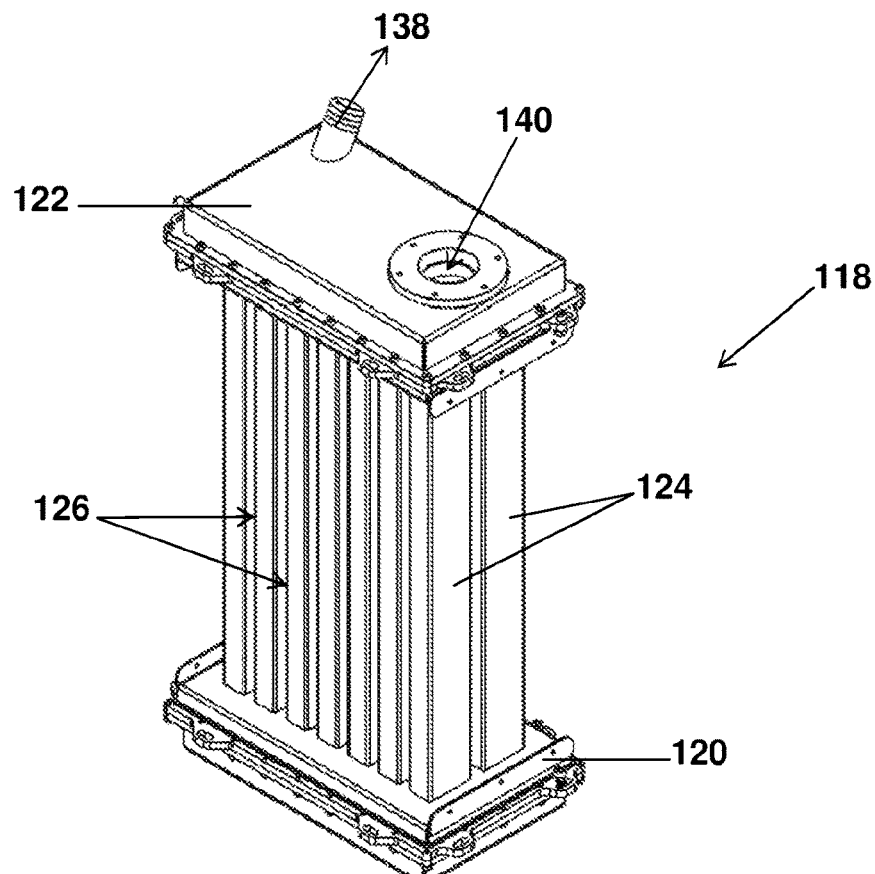
FIG. 17 is a perspective view from above of an exhaust cooler according to the invention.
Figure 18:
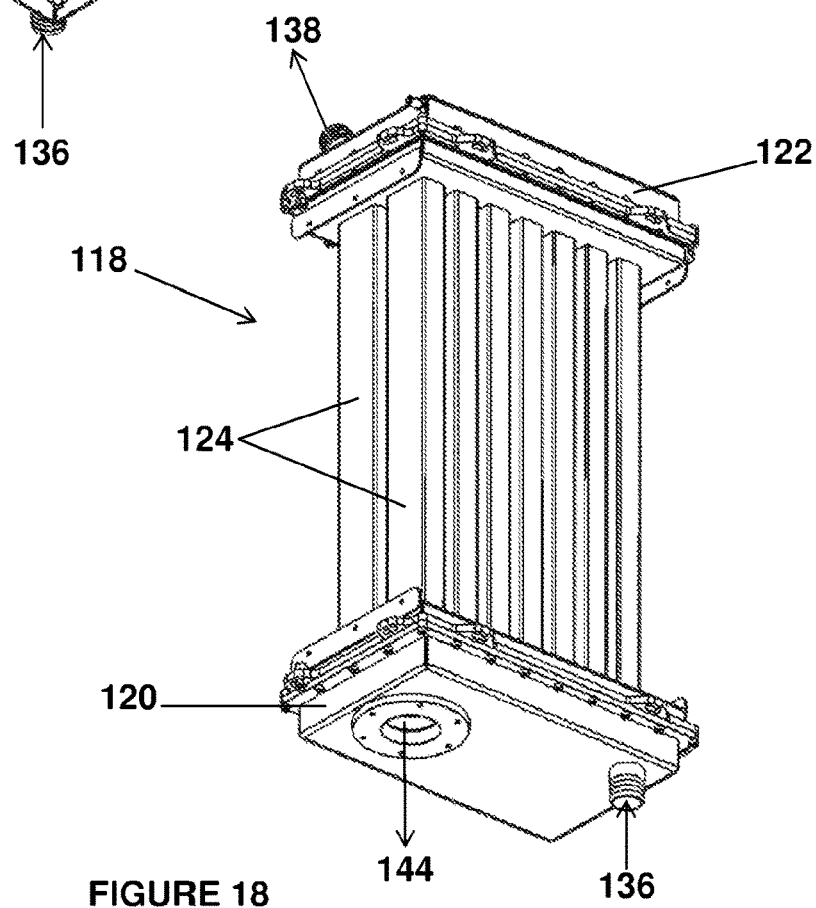
FIG. 18 is a perspective view from below of the exhaust cooler of FIG. 17.
Figure 19:
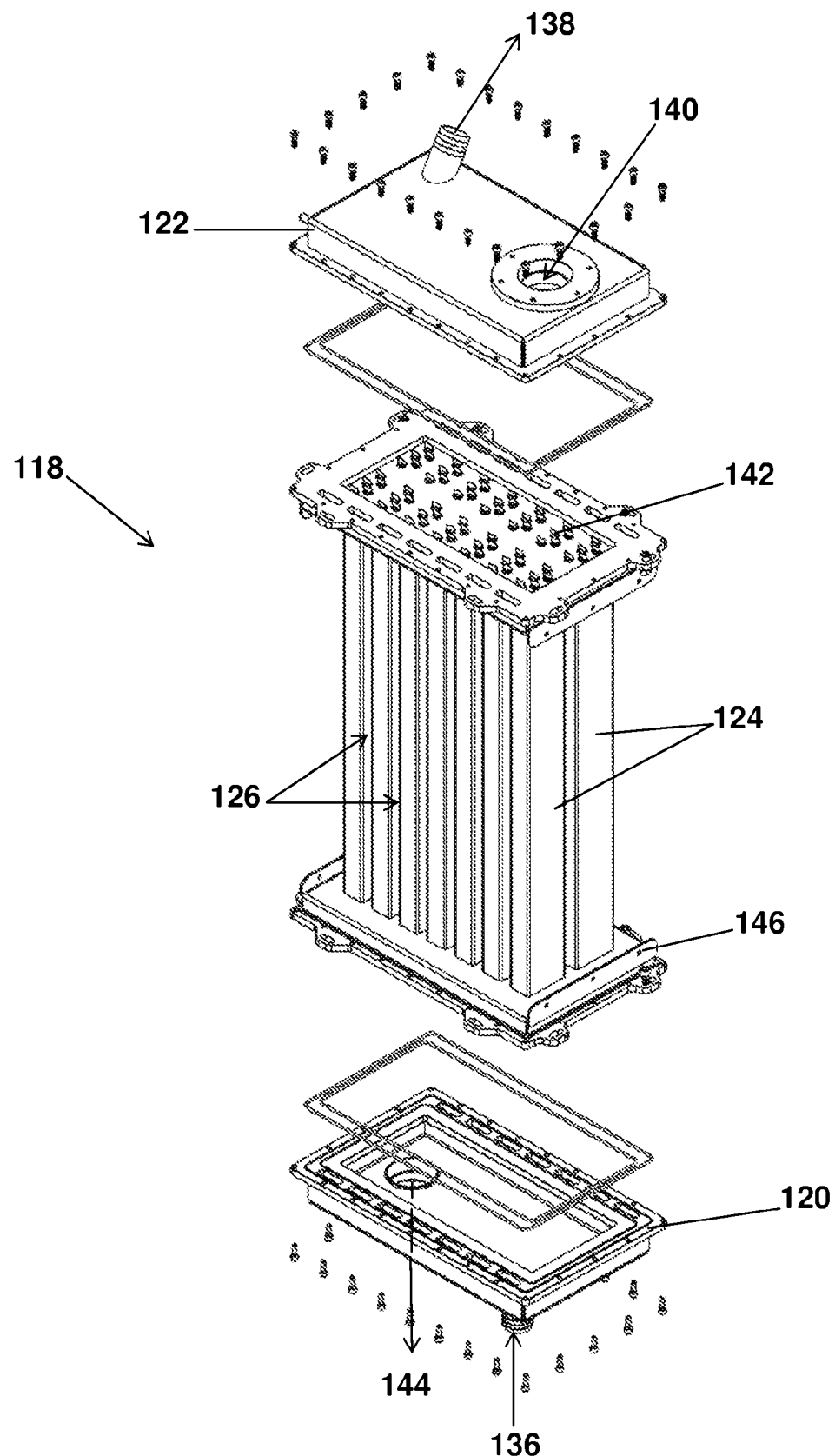
FIG. 19 is an exploded perspective view of the exhaust cooler of FIG. 17.
Figure 20:
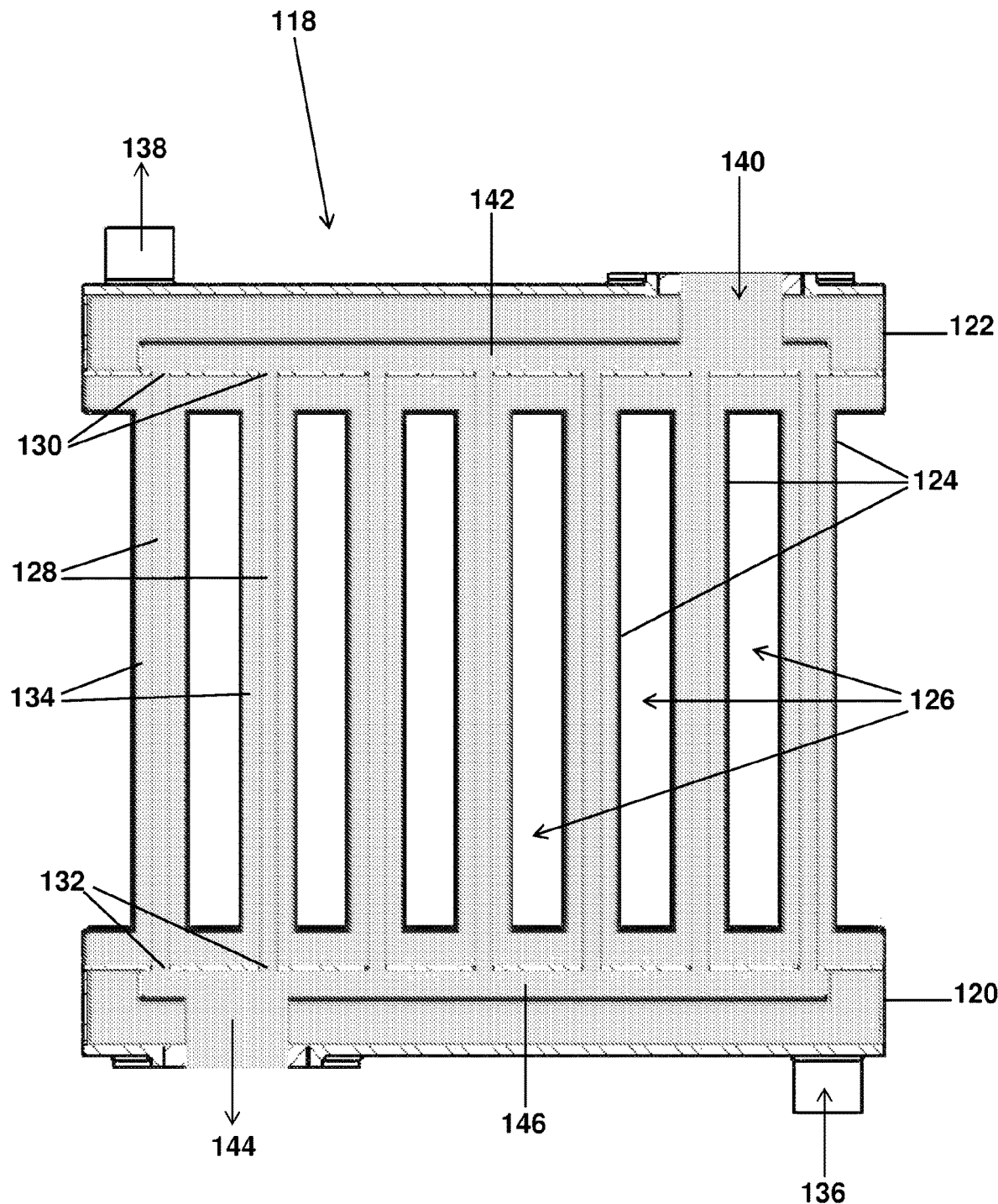
FIG. 20 is a diagrammatic sectional side elevation of the exhaust cooler of FIGS. 17 to 19.
Figures 21, 22:
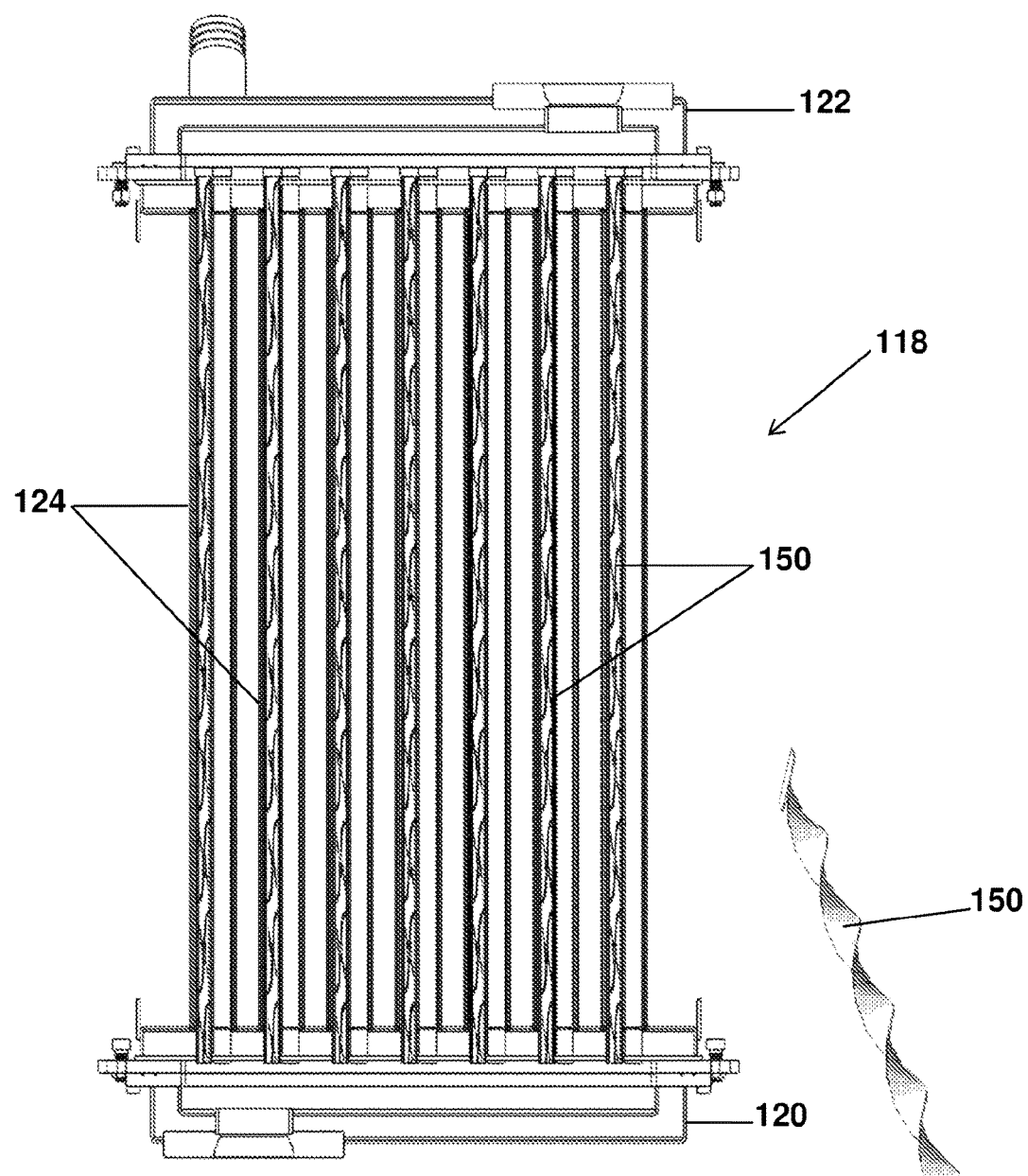
FIG. 21 is a sectional side elevation of the exhaust cooler of FIGS. 17 to 19, illustrating position of the cooling fins within the gas channels.
FIG. 22 is a perspective view of an elongate twisted cooling fin that is positioned within the gas channels of the exhaust cooler.
Figure 23:
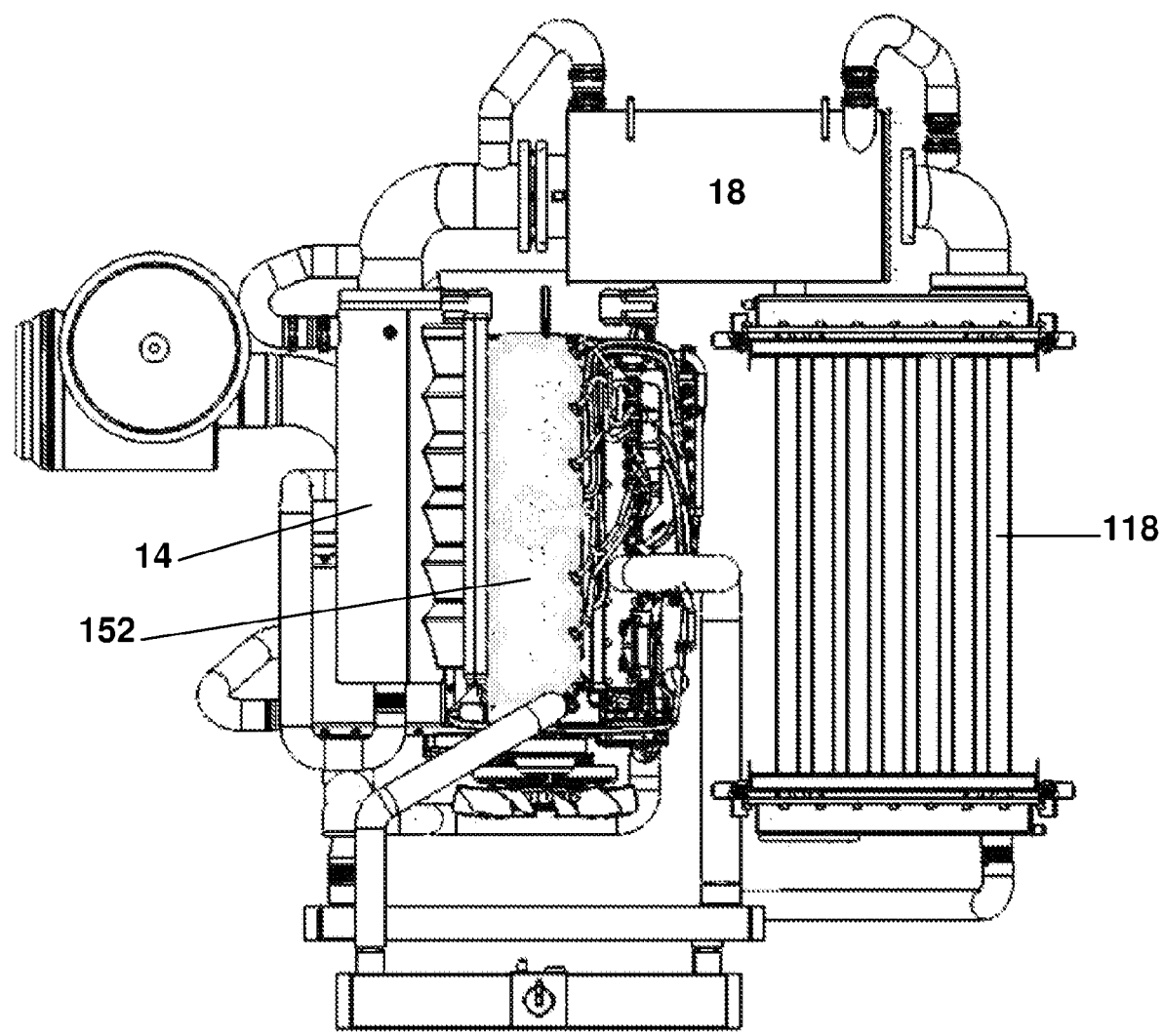
FIG. 23 is a schematic illustration from one angle of rotation of an engine assembly, illustrating positioning of the manifold, turbocharger, catalytic converter and exhaust cooler according to the invention; as well as positioning of a supercharger.
Figure 24:
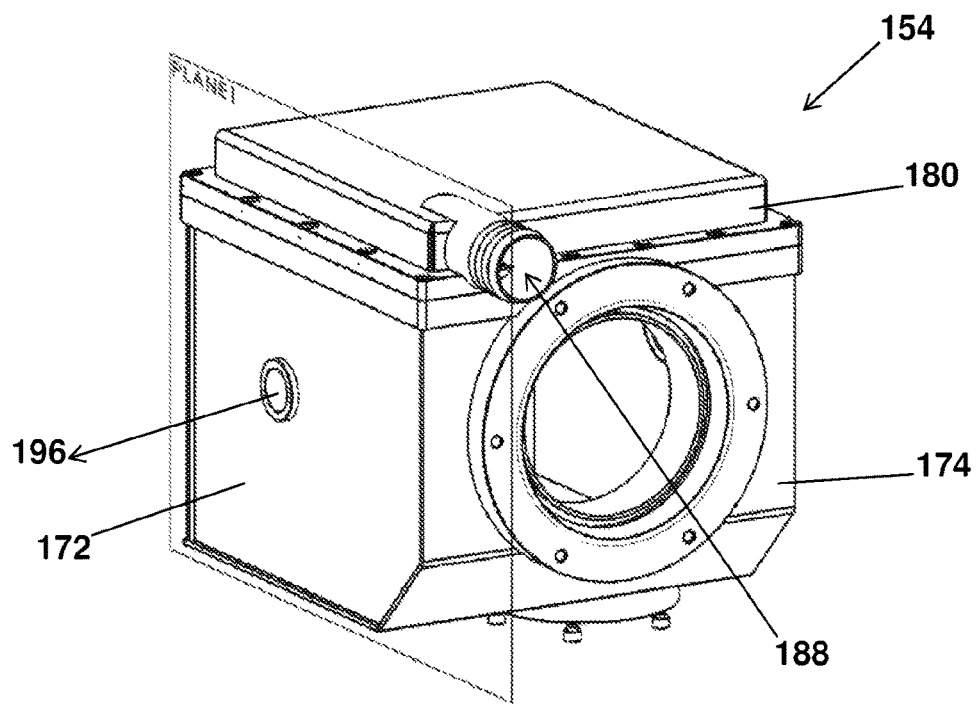
FIG. 24 is an assembled, perspective view of a supercharger housing according to the invention, with the cooled lid in a closed position.
Figure 25:
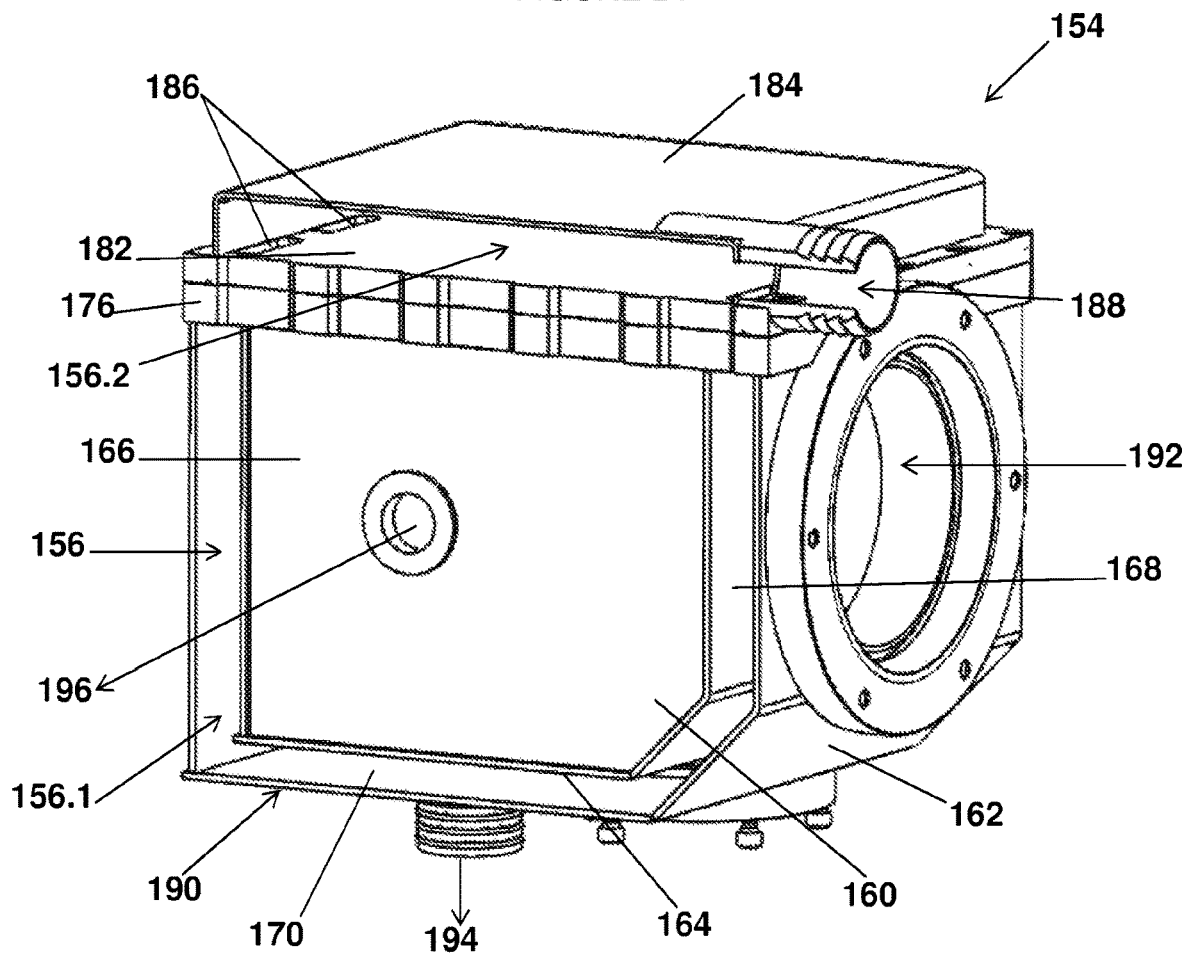
FIG. 25 is a partially sectioned perspective view of the supercharger housing of FIG. 24, sectioned along Plane 1 of FIG. 24.
Figure 26:
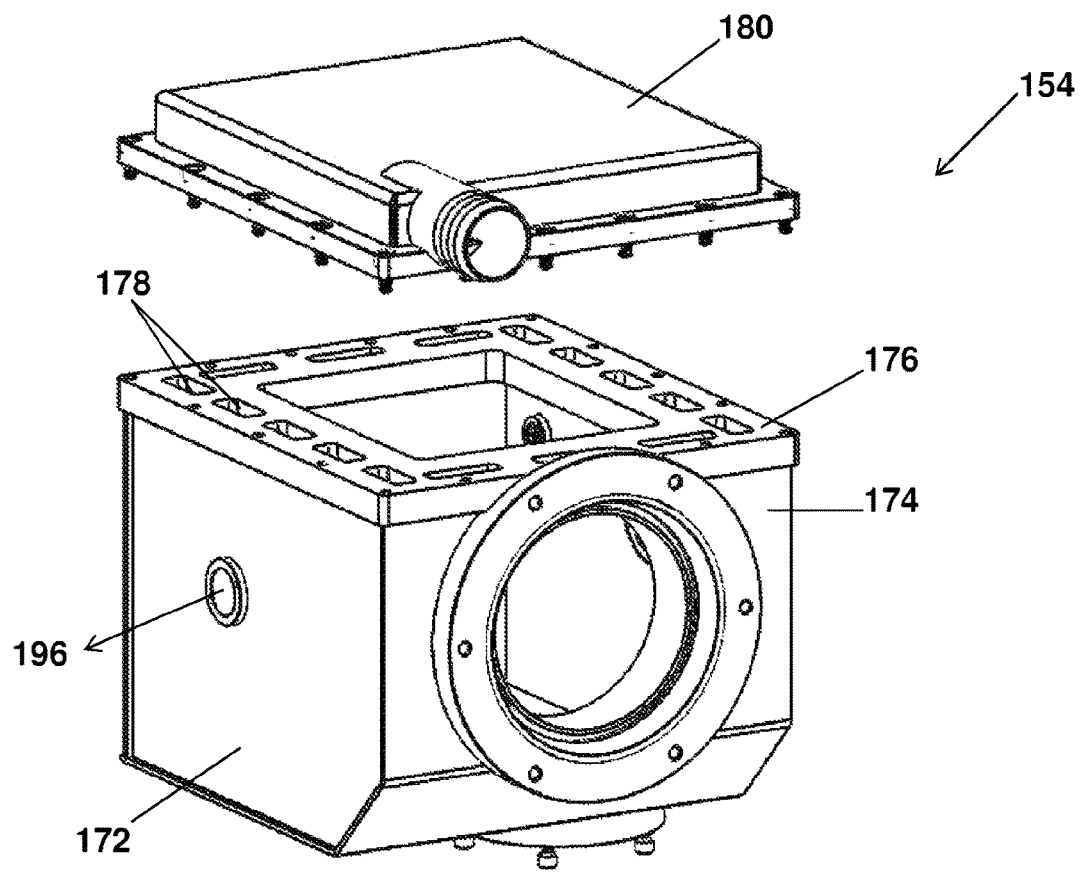
FIG. 26 is an exploded perspective view of the supercharger housing of FIG. 24, with the cooled lid in an open position.
Figure 27:
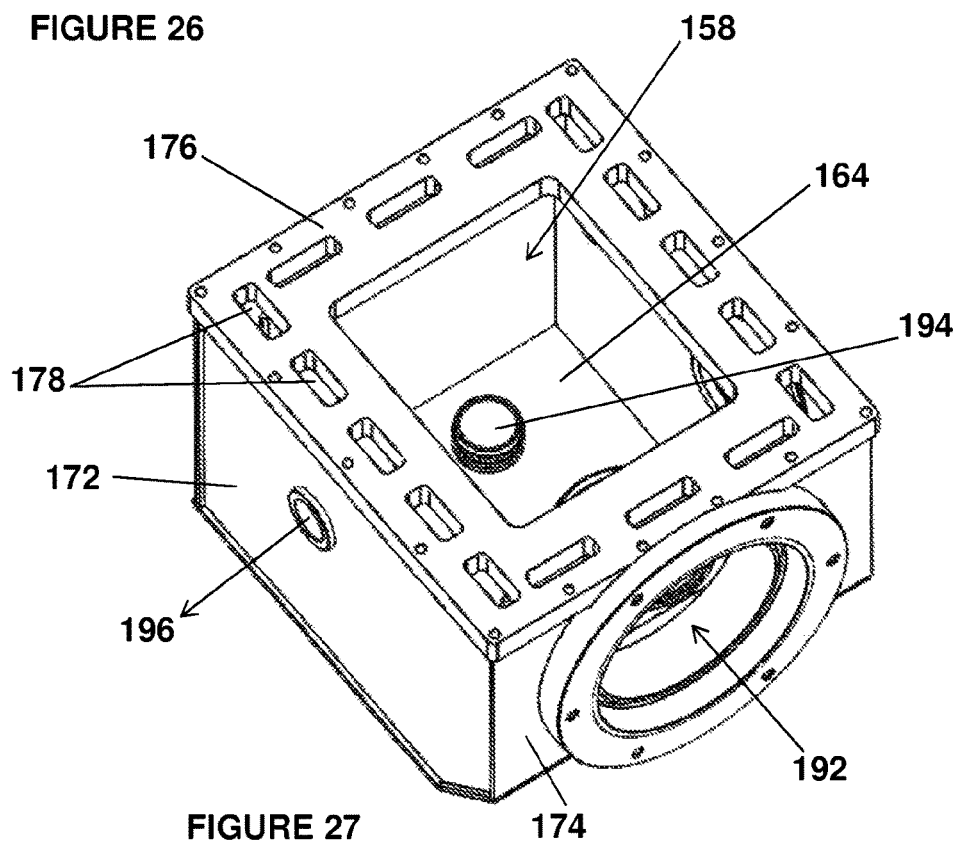
FIG. 27 is a perspective view from a different angle of rotation of the supercharger housing of FIG. 24, with the lid removed.

As illustrated in FIG. 9, the turbocharger housing [34] is configured fully to encase the turbocharger [16].

The turbocharger housing [34] includes an internal housing [50], defining the insulation chamber [38], and an external housing [52], the arrangement being such that a housing fluid chamber [36.1] is defined between the internal housing [50] and the external housing [52], while the turbocharger [16] is receivable within the insulation chamber [38].

In particular, the internal housing [50] includes a substantially planar base wall [54]; two parallel opposing sidewalls [56] extending upright from two opposite sides of the base wall [54]; two parallel opposing end walls [58] extending upright from two opposite ends of the base wall [54] and extending between the opposing sidewalls [56].

The external housing [52] includes a substantially planar base wall [60] which is parallel to and disposed from the base wall [54] of the internal housing [50]; two parallel opposing sidewalls [62] extending upright from two opposite sides of the base wall [60], the sidewalls [62] of the external housing [52] being parallel to and disposed from the sidewalls [56] of the internal housing [50]; two parallel opposing end walls [64] extending upright from two opposite ends of the base wall [60] and extending between the opposing sidewalls [62] of the external housing [52], the ends walls [64] of the external housing [52] being parallel to and disposed from the end walls [58] of the internal housing [50].

The turbocharger housing [34] includes a fluid bridge [66] circumferentially extending about the turbocharger housing [34] and resting atop the sidewalls and end walls of the internal and external housings [50; 52] such that the fluid bridge [66] bridges a circumferential open top gap defined between neighbouring sidewalls [56; 62] and neighbouring ends walls [58; 64] respectively of the internal and external housings [50; 52]. The fluid bridge [66] includes a plurality of fluid apertures [68] extending through the fluid bridge [66] such that cooling fluid from the housing fluid chamber [36.1] can pass through the apertures [68] in the fluid bridge [66].

The insulation chamber [38] is configured fully to accommodate the turbocharger [16] therein, the arrangement being such that ambient air, ceramics or other heat insulation material separates the external surface of the turbocharger [16] from the surrounding fluid chamber [36].

The turbocharger housing [34] also includes a fluid cooled lid [70], which is removably locatable atop the sidewalls and end walls of the internal and external housing [50; 52] such that it is seated atop the fluid bridge [66] and arranged in flow communication with the housing fluid chamber [36.1]. In particular, the lid [70] comprises a substantially planar lid floor [72], and a substantially planar lid roof [74] which is disposed parallel to and spaced from the lid floor [72] such that a lid fluid chamber [36.2] is defined between the lid floor [72] and the lid roof [74]. The lid floor [72] terminate in a series of peripherally disposed lid fluid apertures [76] extending through the lid floor [72] and complimentarily configured to cooperate with the fluid apertures [68] extending through the fluid bridge [66], the arrangement being such that when the lid [70] is seated atop the fluid bridge [66], cooling fluid passes through the lid fluid chamber [36.2], through the lid fluid apertures [76] and the apertures [68] in the fluid bridge [66], and into the housing fluid chamber [36.1]. The lid fluid chamber [36.2] and the housing fluid chamber [36.1] together define the fluid chamber [36] of the turbocharger housing [34].

The turbocharger housing [34] includes a fluid inlet [78] and a fluid outlet [80]. The fluid inlet [78] is arranged in flow communication with the lid fluid chamber [36.2], while the fluid outlet [80] is arranged in flow communication with the housing fluid chamber [36.1]. It will, however, be appreciated that, depending on installation, the fluid inlet [78] may be arranged in flow communication with the housing fluid chamber [36.1], while the fluid outlet [80] may be arranged in flow communication with the lid fluid chamber [36.2].

The turbocharger housing [34] includes a number of apertures extending through the sidewalls and end walls of the housing [34] and which is complimentarily configured to accommodate different elements of the turbocharger [16] protruding through the walls of the turbocharger housing [34]. The turbocharger housing [34] includes an ambient air inlet port [82] through which ambient air is drawn into the turbocharger [16]; an exhaust gas inlet port [84] which is configured to seat against the exhaust manifold [14] and through which emission gasses are drawn into the turbocharger [16]; and an exhaust gas outlet port [86] through which exhaust gasses exit the turbocharger [16] into the catalytic converter [18]. The turbocharger housing [34] also includes an oil port [88] for allowing oil feeding to the turbocharger [16]; and an air pressure port [90] for exporting compressed air to an engine intake manifold.

The cooling system [10] also comprises a catalytic converter housing [92] for at least partially encasing the catalytic converter [18], the catalytic converter housing [92] comprising an outer fluid chamber [94] and an inner insulation chamber [96] arranged intermediate the catalytic converter [18] and the fluid chamber [94], the catalytic converter housing [92] being configured to prevent rapid cooling of emission gasses as they pass through the catalytic converter [18], while simultaneously shielding the catalytic converter's external surface from atmosphere.

A catalytic converter [18] is an emissions control device that converts toxic gases and pollutants in exhaust gasses to less toxic pollutants by catalysing a redox reaction. Catalytic converters [18] require a temperature of at least 420° C. to efficiently convert harmful exhaust gases into inert ones, such as carbon dioxide and water vapour. The catalytic converter housing [92] is configured fully to encase the catalytic converter [18].

The catalytic converter housing [92] is a substantially cylindrical housing and includes a cylindrical internal housing [98], defining the insulation chamber [96], and terminating at one end thereof in a first end wall [100]; and a co-axial, radially outwardly disposed cylindrical external housing [102], terminating at one end thereof in a second end wall [104] which is parallel to and axially disposed from the first end wall [100]; the arrangement being such that a fluid chamber [94] is defined between the internal housing [98] and the external housing [102], while the catalytic converter [18] is receivable within the insulation chamber [96]. The first and second end walls [100; 104] include axially aligned inlet apertures [106] for allowing inlet of emission gasses from the turbocharger [16] into the catalytic converter [18].

The catalytic converter housing [92] includes a fluid seal [108] which radially extends between the internal and external housings [98; 102] for sealing the fluid chamber [94].

The insulation chamber [96] is configured fully to accommodate the catalytic converter [18] therein, the arrangement being such that ambient air, ceramics or other heat insulation material separates the external surface of the catalytic converter [18] from the surrounding fluid chamber [94].

The catalytic converter housing [92] terminates in one open end for receiving the catalytic converter [18] within the insulation chamber [96]. The catalytic converter housing [92] includes a removable housing plate [110] which is seated against and connectable to the fluid seal [108] once the catalytic converter [18] is in place. The housing plate [110] includes an outlet aperture [112] for allowing outlet of emission gasses from the catalytic converter [18] to the exhaust cooler [118]. The catalytic converter housing [92] also includes a flexible bellows [109] which extends from the outlet aperture [112] in the housing plate [110] to the catalytic converter [18] for facilitating gas flow from the catalytic converter [18] out of the catalytic converter housing [92].

The catalytic converter housing [92] includes a fluid inlet [114] and a fluid outlet [116] for allowing circulation of cooling fluid through the fluid chamber [94].

The cooling system [10] also comprises an exhaust cooler [118] adapted for rapidly cooling emission gasses exiting the catalytic converter [18] before they are released to atmosphere.

The exhaust cooler [118] is adapted for cooling emission gasses from an electronically controlled fuel injection engine [12] before the emission gasses are released to atmosphere and is not to be confused with an engine radiator [202]. Typically emission gases exit an engine [12] though an exhaust manifold [14], after which such gases are channelled through a catalytic converter [18] and one or more diesel particulate filters [19] to remove fine diesel particulate matter. Thereafter the hot emission gasses enter the exhaust cooler [118] of the invention at a temperature ranging from 250° C. to 800° C. Once the emission gases have passed through the exhaust cooler [118], they are cooled down to below 150° C., and as such meet legislative requirements for release to atmosphere.

In the illustrated embodiment of the invention the exhaust cooler [118] comprises a base formation [120]; a geometrically spaced, parallel orientated, roof formation [122]; and a plurality of cooling fins [124] extending parallel to each other between the roof formation [122] and the base formation [120]. The cooling fins [124] are spaced apart to define air flow channels [126] between neighbouring cooling fins [124], the arrangement being such that ambient air flow may optionally be forced through the cooling fins [124] via the air flow channels [126].

Each cooling fin [124] comprises an internal gas channel [128] for channelling hot engine emission gases, the gas channel [128] having a gas inlet [130] in the roof formation [122] and a gas outlet [132] in the base formation [120]. Each cooling fin [124] also comprises an external cooling fluid channel [134] for channelling cooling fluid and having a cooling fluid inlet [136] and a cooling fluid outlet [138]. The external cooling fluid channel [134] is co-axially and radially outwardly disposed relative to the internal gas channel [128]; the arrangement being such that hot emission gasses from the engine pass through the internal gas channel [128] between the gas inlet [130] and the gas outlet [132], while simultaneously cooling fluid passes through the external fluid channel [134] between the fluid inlet [136] and the fluid outlet [138] such that thermal energy from the hot emission gasses are transferred to the cooling fluid. At the same time ambient air flow may optionally be forced through the cooling fins [124] via the air flow channels [126]. In the illustrated embodiment of the invention the cooling fluid inlet [136] is in the base formation [120] of the exhaust cooler [118], with the cooling fluid outlet [138] being in the roof formation [122], such that the hot emission gasses flow in one direction from the roof formation [122] to the base formation [120], while the cooling fluid flows in an opposite direction from the base formation [120] to the roof formation [122].

The roof formation [122] includes a primary gas inlet [140]; and a gas inlet manifold [142], which is operatively associated with the primary gas inlet [140], as well as with the gas inlet [130] of each internal gas channel [128], such that emission gas enters the exhaust cooler [118] through the primary gas inlet [140] and is dissipated to the internal gas channel [128] of each cooling fin [124] through the gas inlet manifold [142].

The base formation [120] includes a primary gas outlet [144]; and a gas outlet manifold [146], which is operatively associated with the primary gas outlet [144], as well as with the gas outlet [132] of each internal gas channel [128], such that emission gas exits the exhaust cooler [118] through the gas outlet [132] of each internal gas channel [128] and is channelled to the primary gas outlet [144] through the gas outlet manifold [146].

The external cooling fluid channel [134] of each cooling fin [124] terminates at opposite ends thereof in the base and roof formations [120; 122] respectively such that cooling fluid circulates through the roof formation [122], external channels [134] and the base formation [120], the arrangement being such that the gas inlet manifold [142], internal gas channels [128] and gas outlet manifold [146] are encases in peripherally bordering cooling fluid.

If air cooling is used, the exhaust cooler [118] also may include a cooling fan [148] which is arranged adjacent the exhaust cooler [118] and positioned for blowing ambient air through the cooling fins [124]. The cooling fan [148] is hydraulically, pneumatically or mechanically actuated.

The exhaust cooler [118] also includes a number of elongate, twisted channel inserts [150], with one channel insert [150] being removably located within each of the gas channels [128], the arrangement being such that the channel inserts [150] cause turbulent flow of the emission gasses while the pass through the gas channels [128], thus increasing emission gas contact with the cooling fluid channel [134] and accelerated gas cooling times. Each channel insert [150] is twisted along its longitudinal axis such that it causes helical turbulence in the emission gas flow within the gas channel [128].

Figure 28:
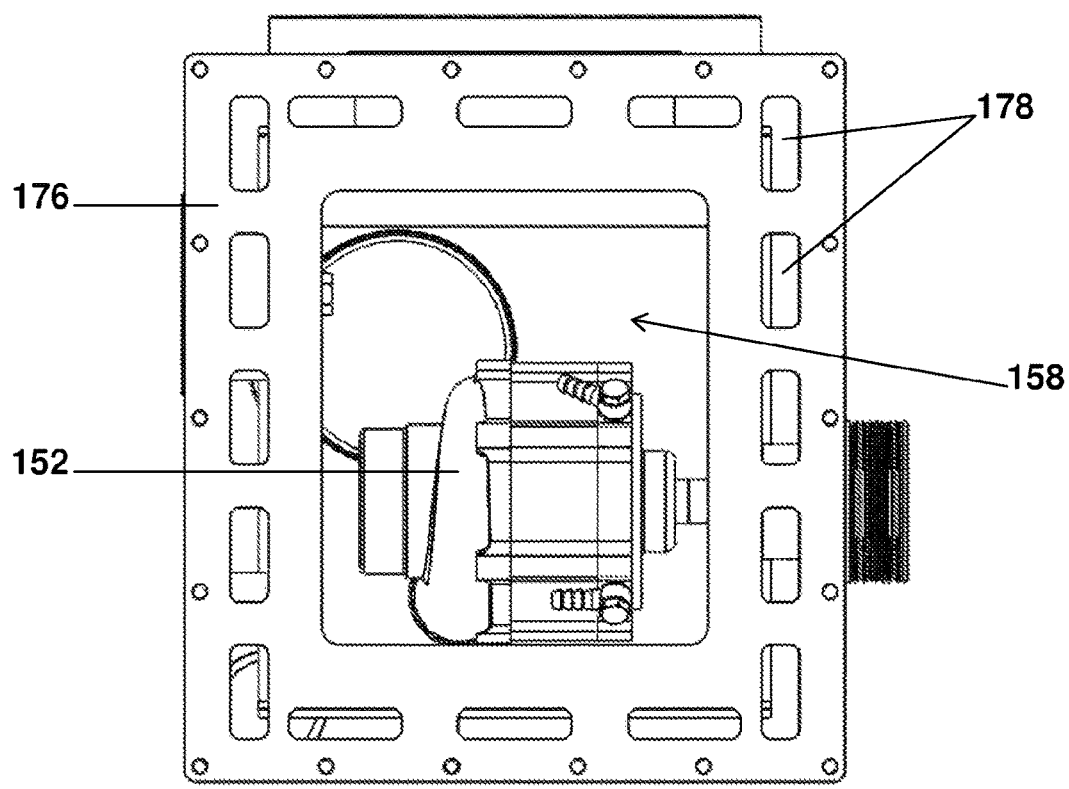
FIG. 28 is a plan view from above of a supercharger housing according to the invention, illustrating location of a supercharger within the supercharger housing.
Figure 29:
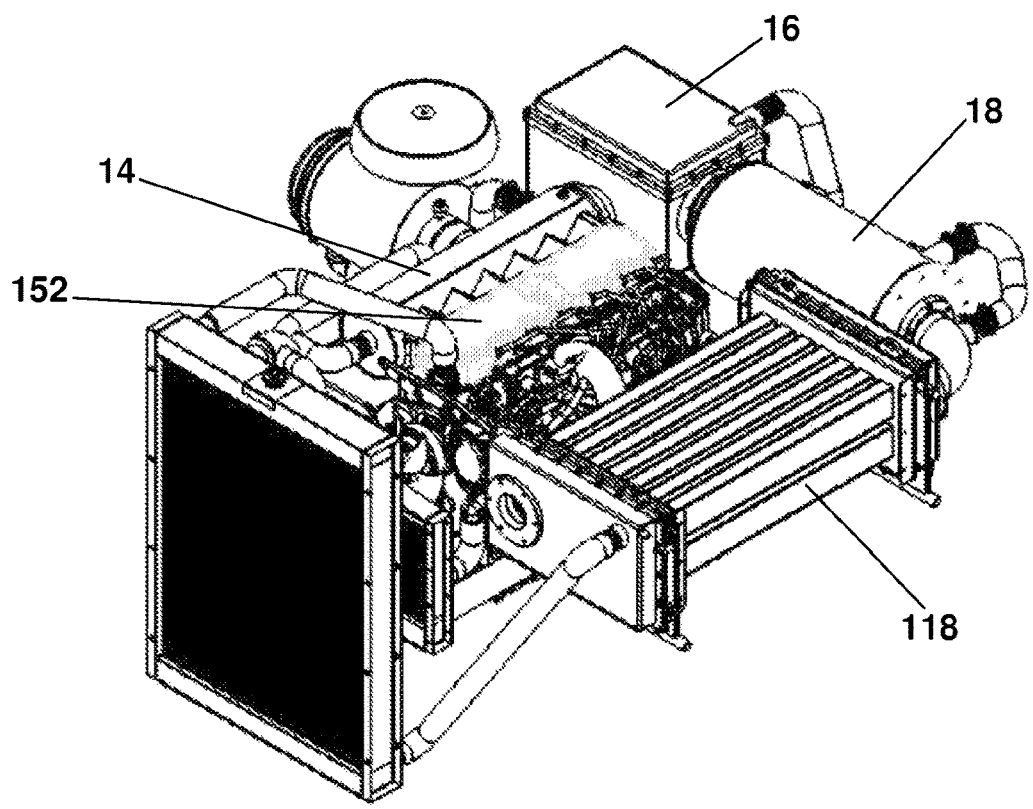
FIG. 29 is a schematic illustration from a different angle of rotation of the engine assembly of FIG. 23.
Figure 30:
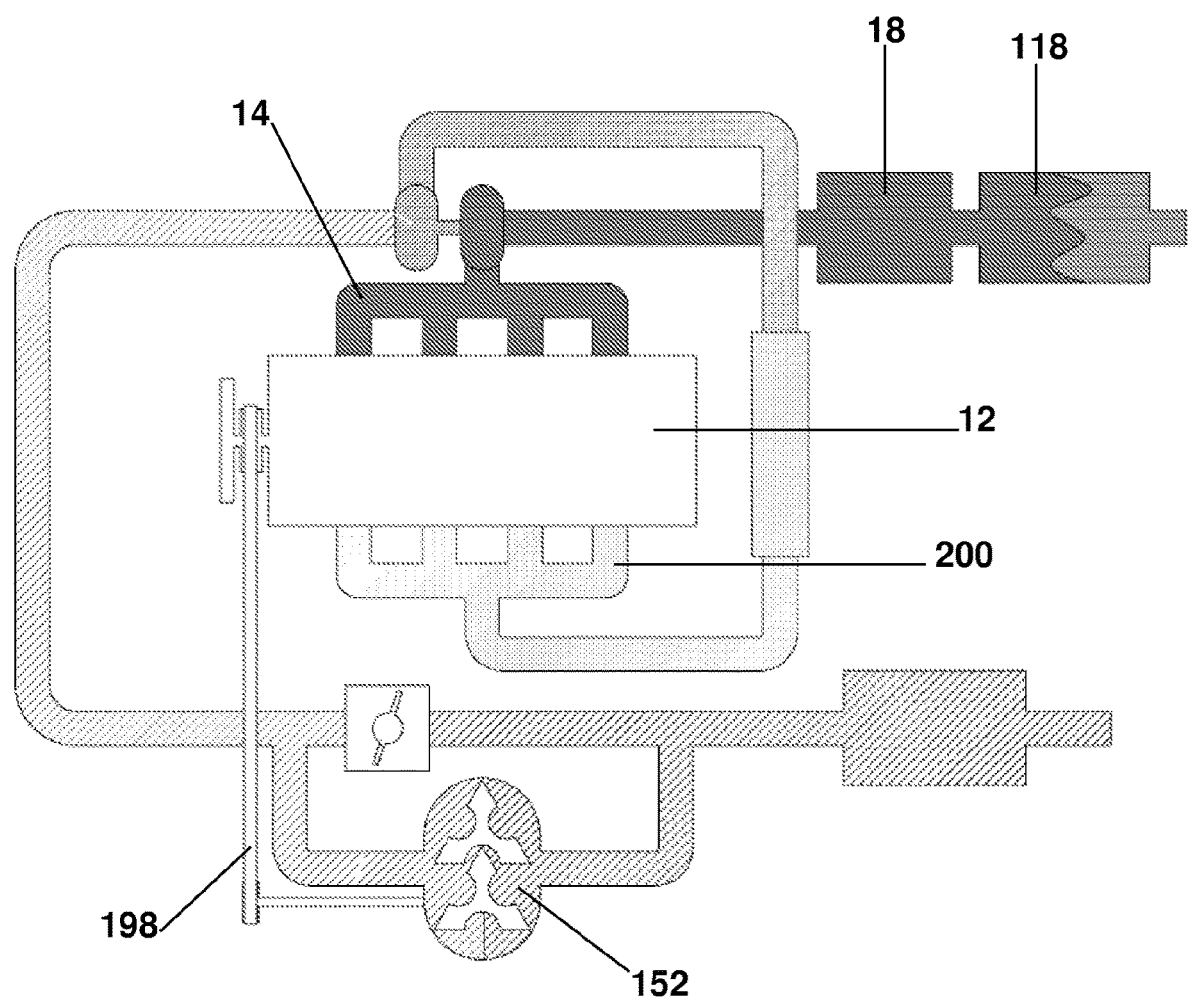
FIG. 30 is a diagrammatic illustration of the engine assembly of FIGS. 23 and 29 which includes both a supercharger and a turbocharger.

Certain fuel injection engines [12] include both a turbocharger [16] and a supercharger [152]. In such embodiments, the cooling system [10] also may include a supercharger housing [154] for encasing the supercharger [152], as illustrated in FIG. 28. The supercharger housing [154] comprises an outer fluid chamber [156] and an inner insulation chamber [158] arranged intermediate the supercharger [152] and the fluid chamber [156], the supercharger housing [154] being configured for shielding the supercharger's external surface from atmosphere.

The supercharger housing [154] includes an internal housing [160], defining the insulation chamber [158], and an external housing [162], the arrangement being such that a housing fluid chamber [156.1] is defined between the internal housing [160] and the external housing [162], while the supercharger [152] is receivable within the insulation chamber [158].

In particular, the internal housing [160] includes a substantially planar base wall [164]; two parallel opposing sidewalls [166] extending upright from two opposite sides of the base wall [164]; two parallel opposing end walls [168] extending upright from two opposite ends of the base wall [164] and extending between the opposing sidewalls [166].

The external housing [162] includes a substantially planar base wall [170] which is parallel to and disposed from the base wall [164] of the internal housing [160]; two parallel opposing sidewalls [172] extending upright from two opposite sides of the base wall [170], the sidewalls [172] of the external housing [162] being parallel to and disposed from the sidewalls [166] of the internal housing [160]; two parallel opposing end walls [174] extending upright from two opposite ends of the base wall [170] and extending between the opposing sidewalls [172] of the external housing [162], the ends walls [174] of the external housing [162] being parallel to and disposed from the end walls [168] of the internal housing [160].

The supercharger housing [154] also includes a fluid bridge [176] circumferentially extending about the supercharger housing [154] and resting atop the sidewalls and end walls of the internal and external housings [160; 162] such that the fluid bridge [176] bridges a circumferential open top gap defined between neighbouring sidewalls [166; 172] and ends walls [168; 174] respectively of the internal and external housings [160; 162]. The fluid bridge [176] includes a plurality of fluid apertures [178] extending through the fluid bridge [176] such that cooling fluid from the housing fluid chamber [156] can pass through the apertures [178] in the fluid bridge [176].

The insulation chamber [158] is configured fully to accommodate the supercharger [152] therein, the arrangement being such that ambient air, ceramics or other heat insulation material separates the external surface of the supercharger [152] from the surrounding fluid chamber [156].

The supercharger housing [154] also includes a fluid cooled lid [180], which is removably locatable atop the sidewalls [166; 172] and end walls [168; 174] of the internal and external housings [160; 162] such that it is seated atop the fluid bridge [176] and arranged in flow communication with the housing fluid chamber [156.1]. In particular, the lid [180] comprises a substantially planar lid floor [182], and a substantially planar lid roof [184] which is disposed parallel to and spaced from the lid floor [182] such that a lid fluid chamber [156.2] is defined between the lid floor [182] and the lid roof [184]. The lid floor [182] terminates in a series of peripherally disposed lid fluid apertures [186] extending through the lid floor [182] and complimentarily configured to cooperate with the fluid apertures [178] extending through the fluid bridge [176], the arrangement being such that when the lid [184] is seated atop the fluid bridge [176], cooling fluid passes through the lid fluid chamber [156.2], through the lid fluid apertures [186] and the apertures [178] in the fluid bridge [176], and into the housing fluid chamber [156.1]. The lid fluid chamber [156.2] and the housing fluid chamber [156.1] together define the fluid chamber [156] of the supercharger housing [154].

The supercharger housing [154] includes a fluid inlet [188] and a fluid outlet [190]. The fluid inlet [188] is arranged in flow communication with the lid fluid chamber [156.2], while the fluid outlet [190] is arranged in flow communication with the housing fluid chamber [156.1]. It will, however, be appreciated that, depending on installation, the fluid inlet [188] may be arranged in flow communication with the housing fluid chamber [156.1], while the fluid outlet [190] may be arranged in flow communication with the lid fluid chamber [156.2].

The supercharger housing [154] includes a number of apertures extending through the sidewalls and end walls of the internal and external housings [160; 162] and configured to accommodate different elements of the supercharger [152] protruding through the walls of the housing [154]. In particular, the supercharger housing [154] includes an air inlet port [192] for drawing air from an air inlet filter into the supercharger [152]; and an air outlet port [194] for exporting compressed air from the supercharger [152] either to an engine intake manifold [200], or if both a supercharger [152] and a turbocharger [16] are present in the engine [12], then to the turbocharger [16]. The supercharger housing [154] also includes a driver port [196] through which a mechanical driver [198] extends to the supercharger [152].

The outer fluid chambers of the manifold housing [20], turbocharger housing [34], catalytic converter housing [92], and supercharger housing [154] (if present) may be arranged in fluid communication with each other and with the exhaust cooler [118] through a network of fluid pipes such that cooling fluid is circulated through the cooling system [10]. In particular, the manifold housing [20] and turbocharger housing [34] may be arranged in fluid communication through fluid pipe [204]. The turbocharger housing [34] may be arranged in fluid communication with the catalytic converter housing [92] through fluid pipe [206]. Similarly, the catalytic converter housing [92] may be arranged in fluid communication with the exhaust cooler [118] through fluid pipe [208]. Emission gas pipe [210] extends between the catalytic converter [18] and the exhaust cooler [118] and is characterised therein that it has a fluid-cooled pipe wall [212] such that emission gas exiting the catalytic converter [18] is immediately subjected to the cool pipe [210].

It will be appreciated by those skilled in the art that by maintaining engine emission gas temperatures in relatively high temperature ranges, optimal after-treatment of the emission gasses is achieved, thus resulting in lower NOx and DPM contaminants in the final released-to-atmosphere gas emissions. The cooling system [10] of the invention is designed to maintain engine emission gasses in the high temperature ranges until after they pass through the catalytic converter [18], thereby ensuring optimal efficacy of the catalytic converter's after-treatment of the gasses, while rapid cooling of the emission gasses through the exhaust cooler [118] still ensures an atmospheric emission gas temperature of below the prescribed 150° C. threshold.

It will be appreciated that other embodiments of the invention are possible without departing from the spirit or scope of the invention as defined in the claims.

The invention claimed is:

1. A cooling system suitable for cooling emission gasses from a fuel injection engine, wherein the fuel injection engine includes an exhaust manifold, a turbocharger, and a catalytic converter through which the emission gasses sequentially pass before they are released to the atmosphere, wherein the cooling system comprises:

an exhaust manifold housing for at least partially encasing the exhaust manifold, the exhaust manifold housing comprising an outer fluid chamber and an inner insulation chamber arranged intermediate the exhaust manifold and the fluid chamber, the exhaust manifold housing being configured to prevent rapid cooling of emission gasses as they pass through the exhaust manifold, while simultaneously shielding the exhaust manifold's external surface from the atmosphere;

a turbocharger housing for at least partially encasing the turbocharger, the turbocharger housing comprising an outer fluid chamber and an inner insulation chamber, wherein (i) the turbocharger housing includes an internal housing defining the insulation chamber, an external housing, and a housing fluid chamber which defined between the internal and external housings, wherein the turbocharger is receivable within the insulation chamber; and wherein the turbocharger housing further includes a fluid cooled lid including a lid fluid chamber, the fluid cooled lid being removably locatable atop the internal and external housings such that cooling fluid passes through the lid fluid chamber and through the housing fluid chamber; and wherein (ii) the turbocharger housing being configured to prevent rapid cooling of emission gasses as they pass through the turbocharger, while simultaneously shielding an external surface of the turbocharger from the atmosphere;

a catalytic converter housing for at least partially encasing the catalytic converter, the catalytic converter housing comprising an outer fluid chamber and an inner insulation chamber arranged intermediate the catalytic converter and the fluid chamber, the catalytic converter housing being configured to prevent rapid cooling of emission gasses as they pass through the catalytic converter, while simultaneously shielding the catalytic converter's external surface from the atmosphere; and an exhaust cooler adapted for rapidly cooling emission gasses exiting the catalytic converter before they are released to the atmosphere, the cooling system being configured such that engine emission gasses are maintained at relatively high temperatures until after they pass through the catalytic converter, and thereafter undergoes rapid cooling as they pass through the exhaust cooler.

2. The cooling system according to claim 1, wherein the cooling system is used in flame proof, electronically controlled, super-charged and turbo-charged fuel injection engines.

3. The cooling system according to claim 2, wherein cooling system is used in electronically controlled, super-charged and turbo-charged diesel engines of trackless mining machinery.

4. The cooling system according to claim 1, wherein
the exhaust manifold housing is configured fully to encase the exhaust manifold, and wherein
the exhaust manifold comprises a series of parallel exhaust manifold discharge channels and a manifold exhaust chamber arranged in flow communication with the discharge channels; wherein
the exhaust manifold housing is complimentarily configured independently to encase each exhaust manifold discharge channel and the manifold exhaust chamber such that each of the exhaust manifold discharge channels and the manifold exhaust chamber is encased in a radially outwardly disposed fluid chamber, and such that an insulation chamber is radially inwardly disposed from the fluid chamber and arranged intermediate the fluid chamber and the external surface of the exhaust manifold.

5. The cooling system according to claim 4, wherein the fluid chamber of the exhaust manifold housing includes a fluid inlet and a fluid outlet for circulation of cooling fluid through the exhaust manifold housing; and wherein the fluid chamber is filled with water or other cooling fluid while the insulation chamber is filled with ambient air, ceramics or other heat insulation material.

6. The cooling system according to claim 1, wherein
(a) the internal housing of the turbocharger housing includes:
a base wall;
two parallel opposing sidewalls extending from two opposite sides of the base wall; and
two parallel opposing end walls extending from two opposite ends of the base wall and extending between the opposing sidewalls; and wherein
(b) the external housing includes:
a base wall which is parallel to and disposed from the base wall of the internal housing;
two parallel opposing sidewalls extending from two opposite sides of the base wall, the sidewalls of the external housing being parallel to and disposed from the sidewalls of the internal housing; and
two parallel opposing end walls extending from two opposite ends of the base wall and extending between the opposing sidewalls of the external housing, the end walls of the external housing being parallel to and disposed from the end walls of the internal housing.

7. The cooling system according to claim 6 wherein the turbocharger housing includes a fluid bridge circumferentially extending about the turbocharger housing and resting atop the sidewalls and end walls of the internal and external housings such that the fluid bridge bridges a circumferential open top gap defined between neighbouring sidewalls and end walls respectively of the internal and external housings and wherein the fluid bridge includes a plurality of fluid apertures extending through the fluid bridge such that cooling fluid from the housing fluid chamber can pass through the apertures in the fluid bridge.

8. The cooling system according to claim 1, wherein the insulation chamber of the turbocharger housing is configured fully to accommodate the turbocharger therein, the arrangement being such that ambient air or other heat insulation material separates the external surface of the turbocharger from the surrounding fluid chamber.

9. The cooling system according to claim 1, wherein
the fluid cooled lid of the turbocharger housing is arranged in flow communication with the housing fluid chamber such that the lid fluid chamber and the housing fluid chamber together define the fluid chamber of the turbocharger housing; and wherein
the turbocharger housing includes a fluid inlet and a fluid outlet, wherein the fluid inlet is either arranged in flow communication with the lid fluid chamber, while the fluid outlet is arranged in flow communication with the housing fluid chamber; or wherein the fluid inlet is arranged in flow communication with the housing fluid chamber, while the fluid outlet is arranged in flow communication with the lid fluid chamber.

10. The cooling system according to claim 7, wherein the fluid cooled lid comprises:
a substantially planar lid floor, and
a substantially planar lid roof which is disposed parallel to and spaced from the lid floor such that the lid fluid chamber is defined between the lid floor and the lid roof, wherein the lid floor terminates in a series of peripherally disposed lid fluid apertures extending through the lid floor and complimentarily configured to cooperate with the fluid apertures extending through the fluid bridge such that when the lid is seated atop the fluid bridge, cooling fluid passes through the lid fluid chamber, through the lid fluid apertures and the apertures in the fluid bridge, and into the housing fluid chamber.

11. The cooling system according to claim 1, wherein the turbocharger housing includes a number of apertures extending through the sidewalls and end walls of the housing which are configured to accommodate different elements of the turbocharger protruding through the walls of the housing.

12. The cooling system according to claim 1, wherein the catalytic converter housing is configured fully to encase the catalytic converter, and wherein
the catalytic converter housing is a substantially cylindrical housing and includes a cylindrical internal housing, defining the insulation chamber, and terminating at one end thereof in a first end wall; and a co-axial, radially outwardly disposed cylindrical external housing, terminating at one end thereof in a second end wall which is parallel to and axially disposed from the first end wall;
wherein a fluid chamber is defined between the internal housing and the external housing, while the catalytic converter is receivable within the insulation chamber, and wherein
the catalytic converter housing includes a fluid inlet, and a fluid outlet for allowing circulation of cooling fluid through the fluid chamber; and wherein
the catalytic converter housing includes a fluid seal which radially extends between the internal and external housings for sealing the fluid chamber; and wherein
the catalytic converter housing includes a removable housing plate which is seated against and connectable to the fluid seal once the catalytic converter is in place, the housing plate including an outlet aperture for allowing outlet of emission gasses from the catalytic converter housing.

13. The cooling system according to claim 12, wherein the first and second end walls include axially aligned inlet apertures for allowing inlet of emission gasses from the turbocharger to the catalytic converter.

14. The cooling system according to claim 12, wherein the insulation chamber of the catalytic converter housing is configured fully to accommodate the catalytic converter therein such that ambient air or other heat insulation material separates the external surface of the catalytic converter from the surrounding fluid chamber.

15. The cooling system according to claim 1, wherein the exhaust cooler comprises:
a base formation; a geometrically spaced, parallel roof formation; and a plurality of elongate cooling fins extending parallel to each other between the roof formation and the base formation, wherein each cooling fin comprises an internal channel having an inlet and an outlet, and an outwardly disposed external channel having an inlet and an outlet, such that a chamber is defined between the internal and the external channels; wherein
hot emission gasses from the engine pass through one channel between the inlet and the outlet, while simultaneously cooling fluid passes through the other channel between the inlet and the outlet such that thermal energy from the hot emission gasses are transferred to the cooling fluid; and wherein
the exhaust cooler is adapted for receiving emission gases within a temperature range of 250° C. to 800° C., and cooling the emission gases down to a temperature not exceeding 150° C. before the gases are released to the atmosphere.

16. The cooling system according to claim 15, wherein
the internal channel of each cooling fin is a gas channel for channelling hot engine emission gases,
the internal channel having a gas inlet in the roof formation and a gas outlet in the base formation, while the external channel is a cooling fluid channel for channelling cooling fluid,
the external channel having a cooling fluid inlet and a cooling fluid outlet; wherein hot emission gasses from the engine pass through the internal gas channel of each cooling fin, while cooling fluid passes through the external fluid channel such that thermal energy from the hot emission gasses is transferred through convection heat transfer to the cooling fluid.

17. The cooling system according to claim 15, wherein the internal channel of each cooling fin is a cooling fluid channel for channelling cooling fluid, the internal channel having a fluid inlet and a fluid outlet; while the external channel of each cooling fin is a gas channel for channelling hot engine emission gases, the external channel having a gas inlet and a gas outlet.

18. The cooling system according to claim 16, wherein the external cooling fluid channel has a cooling fluid inlet in either the base formation or the roof formation, and a cooling fluid outlet in the other of the roof formation or the base formation, such that the hot emission gasses flow in one direction while the cooling fluid flows either in an opposite direction or the same direction as the hot emission gasses flow.

19. The cooling system according to claim 16, wherein
the roof formation includes a primary gas inlet and a gas inlet manifold which is operatively associated with the primary gas inlet as well as with the gas inlet of each internal gas channel such that emission gas enters the exhaust cooler through the primary gas inlet and is dissipated to the internal gas channel of each cooling fin through the gas inlet manifold; and wherein
the base formation includes a primary gas outlet and a gas outlet manifold which is operatively associated with the primary gas outlet as well as with the gas outlet of each internal gas channel such that emission gas exits the exhaust cooler through the gas outlet of each internal gas channel and is channelled to the primary gas outlet through the gas outlet manifold.

20. The cooling system according to claim 19, wherein the external cooling fluid channel terminates at opposite ends thereof in the roof and base formations respectively such that cooling fluid circulates through the roof formation, external channels and the base formation such that the gas inlet manifold, internal gas channels and gas outlet manifold are encased within peripherally bordering cooling fluid.

21. The cooling system according to claim 1, wherein the exhaust cooler is positioned to receive emission gasses after they have passed through the catalytic converter and one or more diesel particulate filters.

22. The cooling system according to claim 1, wherein the exhaust cooler is linked to an engine water circulation system, which includes a water reservoir, engine radiator and a pump, wherein the engine radiator transfers heat energy from the engine cooling water to ambient air such that the cooling water which is channeled through the exhaust cooler to cool the emission gasses is also channeled through the engine radiator.

23. The cooling system according to claim 16, wherein
the exhaust cooler also includes a number of elongate, twisted channel inserts, with one channel insert being removably located within each of the gas channels, wherein
the channel inserts cause turbulent flow of the emission gasses while they pass through the gas channels, thus increasing emission gas contact with the cooling fluid channel and accelerated gas cooling times; and wherein
each channel insert is twisted along its longitudinal axis such that it causes spiral turbulence in the emission gas flow within the gas channel.

24. The cooling system according to claim 1, wherein
the fuel injection engine also includes a supercharger and a supercharger housing for at least partially encasing the supercharger for shielding an external surface of the supercharger from the atmosphere, the supercharger housing comprising an outer fluid chamber and an inner insulation chamber, and wherein
the supercharger housing includes an internal housing, defining the insulation chamber; and an external housing such that a housing fluid chamber is defined between the internal and external housings, while the supercharger is receivable within the insulation chamber; and wherein the supercharger housing also includes a fluid cooled lid with a lid fluid chamber, the fluid cooled lid being removably locatable atop the internal and external housings such that cooling fluid passes through the lid fluid chamber and through the housing fluid chamber.

25. The cooling system according to claim 24, wherein
the internal housing includes a base wall; two parallel opposing sidewalls extending from two opposite sides of the base wall; and two parallel opposing end walls extending from two opposite ends of the base wall and extending between the opposing sidewalls; and wherein
the external housing includes a base wall which is parallel to and disposed from the base wall of the internal housing; two parallel opposing sidewalls extending from two opposite sides of the base wall, the sidewalls of the external housing being parallel to and disposed from the sidewalls of the internal housing; two parallel opposing end walls extending from two opposite ends of the base wall and extending between the opposing sidewalls of the external housing, the end walls of the external housing being parallel to and disposed from the end walls of the internal housing.

26. The cooling system according to claim 25, wherein
the supercharger housing includes a fluid bridge circumferentially extending about the supercharger housing and resting atop the sidewalls and end walls of the internal and external housings such that the fluid bridge bridges a circumferential open top gap defined between neighbouring sidewalls and end walls respectively of the internal and external housings, and wherein
the fluid bridge includes a plurality of fluid apertures extending through the fluid bridge such that cooling fluid from the housing fluid chamber can pass through the apertures in the fluid bridge.

27. The cooling system according to claim 24, wherein the insulation chamber of the supercharger housing is configured fully to accommodate the supercharger therein such that ambient air or other heat insulation material separates the external surface of the supercharger from the surrounding fluid chamber.

28. The cooling system according to claim 24, wherein
the fluid cooled lid of the supercharger housing is arranged in flow communication with the housing fluid chamber such that the lid fluid chamber and the housing fluid chamber together define the fluid chamber of the supercharger housing, and wherein
the supercharger housing includes a fluid inlet and a fluid outlet, wherein either (i) the fluid inlet is arranged in flow communication with the lid fluid chamber, while the fluid outlet is arranged in flow communication with the housing fluid chamber, or (ii) the fluid inlet is arranged in flow communication with the housing fluid chamber, while the fluid outlet is arranged in flow communication with the lid fluid chamber.

29. The cooling system according to claim 26, wherein the lid comprises:
a substantially planar lid floor, and
a substantially planar lid roof which is disposed parallel to and spaced from the lid floor such that the lid fluid chamber is defined between the lid floor and the lid roof; wherein
the lid floor terminates in a series of peripherally disposed lid fluid apertures extending through the lid floor and complimentarily configured to cooperate with the fluid apertures extending through the fluid bridge, wherein
when the lid is seated atop the fluid bridge, cooling fluid passes through the lid fluid chamber, through the lid fluid apertures and the apertures in the fluid bridge, and into the housing fluid chamber.

30. The cooling system according to claim 24, wherein the supercharger housing includes a number of apertures extending through the sidewalls and end walls of the housing and which are configured to accommodate different elements of the supercharger protruding through the walls of the housing.

31. A cooling system suitable for cooling emission gasses from a fuel injection engine, wherein the fuel injection engine includes a turbocharger, the cooling system comprising a turbocharger housing for at least partially encasing the turbocharger, wherein the turbocharger housing comprises:
an outer fluid chamber and an inner insulation chamber; wherein the turbocharger housing includes:
an internal housing defining the insulation chamber,
an external housing, and
a housing fluid chamber defined between the internal and external housings while the turbocharger is receivable within the insulation chamber; the turbocharger housing further including a fluid cooled lid including a lid fluid chamber,
the fluid cooled lid being removably locatable atop the internal and external housings such that cooling fluid passes through the lid fluid chamber and through the housing fluid chamber; the turbocharger housing being configured to prevent rapid cooling of emission gasses as they pass through the turbocharger, while simultaneously shielding the turbocharger's external surface from the atmosphere; and
an exhaust cooler adapted for rapidly cooling emission gasses before the exhaust gasses are released to the atmosphere, wherein
the cooling system being configured such that engine emission gasses are maintained at relatively high temperatures until they pass through the exhaust cooler, when the emission gasses undergo rapid cooling.

32. The cooling system according to claim 31, wherein
the lid fluid chamber is arranged in flow communication with the housing fluid chamber such that the lid fluid chamber and the housing fluid chamber together define the outer fluid chamber of the turbocharger housing; and wherein
the cooling fluid passes through the lid fluid chamber into the housing fluid chamber; and wherein
the turbocharger housing includes a fluid inlet and a fluid outlet, wherein the fluid inlet is either arranged in flow communication with the lid fluid chamber while the fluid outlet is arranged in flow communication with the housing fluid chamber, or wherein the fluid inlet is arranged in flow communication with the housing fluid chamber while the fluid outlet is arranged in flow communication with the lid fluid chamber.

33. A cooling system suitable for cooling emission gasses from a fuel injection engine, wherein the cooling system comprises:
a catalytic converter housing for at least partially encasing a catalytic converter of the fuel injection engine, wherein
the catalytic converter housing is a substantially cylindrical housing and includes a cylindrical internal housing, defining the insulation chamber, and terminating at one end thereof in a first end wall, and a co-axial, radially outwardly disposed cylindrical external housing, terminating at one end thereof in a second end wall which is parallel to and axially disposed from the first end wall; wherein
a fluid chamber is defined between the internal housing and the external housing, while the catalytic converter is receivable within the insulation chamber; and wherein
the catalytic converter housing further includes a fluid inlet and a fluid outlet for allowing circulation of cooling fluid through the fluid chamber; and wherein
the catalytic converter housing includes a fluid seal which radially extends between the internal and external housings for sealing the fluid chamber; and wherein
the catalytic converter housing includes a removable housing plate which is seated against and connectable to the fluid seal once the catalytic converter is in place, the housing plate including an outlet aperture for allowing outlet of emission gasses from the catalytic converter housing; and
an exhaust cooler adapted for rapidly cooling emission gasses exiting the catalytic converter before they are released to the atmosphere,
the cooling system being configured such that engine emission gasses are maintained at relatively high temperatures until they pass through the exhaust cooler, when the emission gasses undergo rapid cooling.

34. A turbocharger system suitable for use in a fuel injection engine, the turbocharger system comprising:
a turbocharger housing, and
a turbocharger which is at least partially encased in the turbocharger housing, the turbocharger housing comprising an outer fluid chamber and an inner insulation chamber; wherein the turbocharger housing includes an internal housing, defining the insulation chamber, and an external housing, wherein
a housing fluid chamber is defined between the internal and external housings, while the turbocharger is receivable within the insulation chamber;
the turbocharger housing further including a fluid cooled lid including a lid fluid chamber, the fluid cooled lid being removably locatable atop the internal and external housings, wherein
cooling fluid passes through the lid fluid chamber and through the housing fluid chamber; the turbocharger housing being configured to prevent rapid cooling of emission gasses as they pass through the turbocharger, while simultaneously shielding the turbocharger's external surface from the atmosphere.

35. The turbocharger system according to claim 34, wherein
the lid fluid chamber is arranged in flow communication with the housing fluid chamber such that the lid fluid chamber and the housing fluid chamber together define the outer fluid chamber of the turbocharger housing; and wherein
cooling fluid passes through the lid fluid chamber into the housing fluid chamber; and wherein
the turbocharger housing includes a fluid inlet and a fluid outlet, wherein the fluid inlet is either arranged in flow communication with the lid fluid chamber while the fluid outlet is arranged in flow communication with the housing fluid chamber, or wherein the fluid inlet is arranged in flow communication with the housing fluid chamber while the fluid outlet is arranged in flow communication with the lid fluid chamber.

36. A catalytic converter system suitable for use in a fuel injection engine comprising:
a catalytic converter housing, and
a catalytic converter which is at least partially encased in the catalytic converter housing, wherein
the catalytic converter housing is a substantially cylindrical housing and includes a cylindrical internal housing defining the insulation chamber and terminating at one end thereof in a first end wall; and a co-axial, radially outwardly disposed cylindrical external housing terminating at one end thereof in a second end wall which is parallel to and axially disposed from the first end wall; and wherein
a fluid chamber is defined between the internal housing and the external housing while the catalytic converter is receivable within the insulation chamber; and wherein
the catalytic converter housing further includes a fluid inlet and a fluid outlet for allowing circulation of cooling fluid through the fluid chamber; and wherein
the catalytic converter housing includes a fluid seal which radially extends between the internal and external housings for sealing the fluid chamber; and wherein
the catalytic converter housing includes a removable housing plate which is seated against and connectable to the fluid seal once the catalytic converter is in place, the housing plate including an outlet aperture for allowing outlet of emission gasses from the catalytic converter housing.

37. An exhaust cooler suitable for use in a fuel injection engine comprising:
a base formation;
a geometrically spaced, parallel roof formation;
a plurality of elongate cooling fins extending parallel to each other between the roof formation and the base formation, wherein
each cooling fin comprises an internal gas channel having an inlet and an outlet, and an outwardly disposed external fluid channel having an inlet and an outlet, such that a chamber is defined between the internal and the external channels such that hot emission gasses from the engine pass through the internal channel between the inlet and the outlet, while simultaneously cooling fluid passes through the external channel between the inlet and the outlet such that thermal energy from the hot emission gasses are transferred to the cooling fluid; and wherein the roof formation includes a primary gas inlet and a gas inlet manifold which is operatively associated with the primary gas inlet as well as with the gas inlet of each internal gas channel such that emission gas enters the exhaust cooler through the primary gas inlet and is dissipated to the internal gas channel of each cooling fin through the gas inlet manifold; and wherein the base formation includes a primary gas outlet, and a gas outlet manifold which is operatively associated with the primary gas outlet, as well as with the gas outlet of each internal gas channel such that emission gas exits the exhaust cooler through the gas outlet of each internal gas channel and is channelled to the primary gas outlet through the gas outlet manifold.

38. A supercharger system suitable for use in a fuel injection engine, comprising:

a supercharger housing; and a supercharger at least partially encased in the supercharger housing, wherein the supercharger housing includes:

(i) an outer fluid chamber and an inner insulation chamber, (ii) an internal housing defining the insulation chamber, and an external housing, (iii) a housing fluid chamber which is defined between the internal housing and the external housing while the supercharger is receivable within the insulation chamber; and (iv) a fluid cooled lid with a lid fluid chamber, the fluid cooled lid being removably locatable atop the internal and external housings such that cooling fluid passes through the lid fluid chamber and through the housing fluid chamber.

39. The supercharger system according to claim 38, wherein the lid fluid chamber is arranged in flow communication with the housing fluid chamber such that the lid fluid chamber and the housing fluid chamber together define the fluid chamber of the supercharger housing; and wherein the supercharger housing includes a fluid inlet and a fluid outlet, wherein either the fluid inlet is arranged in flow communication with the lid fluid chamber, while the fluid outlet is arranged in flow communication with the housing fluid chamber; or wherein the fluid inlet is arranged in flow communication with the housing fluid chamber, while the fluid outlet is arranged in flow communication with the lid fluid chamber.

* * * * *